US009948785B2

(12) United States Patent
Fadili et al.

(10) Patent No.: US 9,948,785 B2
(45) Date of Patent: Apr. 17, 2018

(54) METHODS AND NODES FOR CONTROLLING A CONFERENCE COMMUNICATION

(71) Applicant: ALE INTERNATIONAL, Colombes (FR)

(72) Inventors: Moulay Fadili, Colombes (FR); Roman Sorokin, Colombes (FR); Stéphane Coulon, Colombes (FR)

(73) Assignee: ALE INTERNATIONAL, Colombes (FR)

( * ) Notice: Subject to any disclaimer, the term of this patent is extended or adjusted under 35 U.S.C. 154(b) by 143 days.

(21) Appl. No.: 15/076,821

(22) Filed: Mar. 22, 2016

(65) Prior Publication Data
US 2017/0279968 A1    Sep. 28, 2017

(51) Int. Cl.
| H04L 12/16 | (2006.01) |
| H04M 3/56 | (2006.01) |
| H04L 29/06 | (2006.01) |
| H04N 7/14 | (2006.01) |
| H04N 7/15 | (2006.01) |

(52) U.S. Cl.
CPC ........ H04M 3/562 (2013.01); H04L 65/1006 (2013.01); H04L 65/1069 (2013.01); H04L 65/1093 (2013.01); H04N 7/147 (2013.01); H04N 7/152 (2013.01)

(58) Field of Classification Search
CPC ............... H04M 3/562; H04L 65/1006; H04L 65/1069; H04L 65/1093; H04N 7/147; H04N 7/152
USPC ........................................................ 370/260
See application file for complete search history.

(56) References Cited

U.S. PATENT DOCUMENTS

| 2014/0002584 A1 | 1/2014 | Moon et al. |
| 2014/0267571 A1 | 9/2014 | Periyannan et al. |
| 2017/0126406 A1* | 5/2017 | Reddy .................... H04L 9/3066 |
| 2017/0244767 A1* | 8/2017 | Jana ....................... H04L 65/403 |

* cited by examiner

Primary Examiner — Mang Yeung
(74) Attorney, Agent, or Firm — BCF LLP

(57) ABSTRACT

A method and a resource broker are provided to control a conference session. The resource broker receives, from a conference controller, a message requesting to set up a conference communication for a participant. The message indicates whether a terminal of the participant supports selective forwarding. The resource broker verifies the availability of local selective forwarding and multipoint control resources. Based on the capabilities of the terminal and based on local resource availability, a reply is sent to the conference controller, indicating that the conference communication should be set up in selective forwarding or multipoint control mode, using local resources or resources of a network cloud. When a new participant is added or when a monitoring agent reports a change of availability of the local resources, the conference communication may be moved between the network cloud and the local resources, or change between selective forwarding and multipoint control modes.

21 Claims, 10 Drawing Sheets

मेथड्स AND NODES FOR CONTROLLING A CONFERENCE COMMUNICATION

FIELD

The present technology relates to methods and nodes for controlling a conference communication. In particular, the nodes and methods aim at determining a type conference control and location of resources supporting the conference communication.

BACKGROUND

A traditional technique for holding video conference is called multipoint control. A multipoint control unit (MCU) is a device that bridges and combines two (2) or more media streams, for example audio/video feeds, from a plurality of participants so that all participants can be provided with the same combined media stream. Multipoint control can be processor intensive and bandwidth intensive. Multipoint control requires decoding and re-encoding of the media streams, a process that adds latency and negatively impacts the user experience. These drawbacks of multipoint control may be significant, especially as the number of participants to the video conference grows. Selective forwarding is a more recent technology.

A selective forwarding unit (SFU) receives media streams from two (2) or more participants and determines which of these media streams should be forwarded to which participants. Selective forwarding is less processor intensive than multipoint control. However, terminals used by participants to a conference communication may not all be capable of supporting selective forwarding.

A so-called "network cloud" may provide a large amount of resources sufficient to accommodate high-bandwidth, high-processing communications such as a video conference between an important number of participants. However, for many organizations, the cost of holding a video conference on the network cloud may be prohibitive.

Accordingly, improvements aiming at optimizing set-up and control of conference communications may be desirable.

SUMMARY

It is an object of present technology to provide improvements, in particular improvements aiming at increasing the efficiency of use of resources when serving a conference communication while at the same time accounting for the capabilities of terminals participating in the conference communication.

The present technology arises from an observation made by the inventors that, on one hand, information provided by the terminal of a participant regarding its capabilities and, on the other hand, information provided by local resources about their current availability, may be relied upon to determine a type of conference communication to be set up and to determine whether the conference communication is to be set up using the local resources or using a network cloud. In some embodiments, the type of conference communication may be one of a selective forwarding conference and of a multipoint control conference. In some embodiments, the local resources may comprise a fog network. In some embodiments, a change in the availability of local resources may trigger moving the conference communication from the network cloud to the local resources. In some embodiments, addition of a participant to the conference communication may trigger moving the conference communication from the local resources to the network cloud. In some embodiments, addition of a participant to the conference communication may trigger changing the type of conference communication from a selective forwarding conference to a multipoint control conference.

Thus, in one aspect, various implementations of the present technology provide a conference control method, comprising:

receiving, at a resource broker, from a conference controller, a first message requesting to set up a conference communication for a first participant, the first message indicating whether a terminal of the first participant supports selective forwarding;

verifying an availability of local resources at the resource broker;

if the first participant's terminal supports selective forwarding and if the local resources are available to serve the conference communication using selective forwarding, sending a reply, from the resource broker to the conference controller, indicating that the conference communication is to be set up on the local resources using selective forwarding;

if the first participant's terminal does not support selective forwarding and if the local resources are available to serve the conference communication using multipoint control, sending a reply, from the resource broker to the conference controller, indicating that the conference communication is to be set up on the local resources using multipoint control;

if the first participant's terminal supports selective forwarding and if the local resources are not available to serve the conference communication using selective forwarding, sending a reply, from the resource broker to the conference controller, indicating that the conference communication is to be set up on a network cloud using selective forwarding; and if the first participant's terminal does not support selective forwarding and if the local resources are not available to serve the conference communication using multipoint control, sending a reply, from the resource broker to the conference controller, indicating that the conference communication is to be set up on the network cloud using multipoint control.

In some implementations, if the conference communication is to be set up on the local resources, the method includes adding in the reply, by the resource broker, a reference to a specific local resource for setting up the conference communication.

In some further implementations, multipoint control and selective forwarding are served by a common local resource.

In some implementations, multipoint control and selective forwarding are served by distinct local resources.

In some further implementations, the method includes verifying the availability of local resources comprises determining that the local resources are not available if a first rule does not allow the use of the local resources for setting up the conference communication.

In some implementations, verifying the availability of local resources comprises determining that the local resources are sufficient to serve the conference communication at a predetermined quality of service level.

In some further implementations, the method includes receiving, at the resource broker, from a monitoring agent, a signal indicating one of a loading level and an availability state for a local server, and updating, in a database of the resource broker, one of a current loading level and a current availability state for the local server, wherein verifying the availability of local resources comprises verifying the current loading level and the current availability state of the local server.

In some implementations, if the signal received from the monitoring agent indicates an increase of available local resources, if the conference communication has been set up on the network cloud using selective forwarding and if local resources are sufficient to serve the conference communication using selective forwarding, the method includes sending, from the resource broker to the conference controller, a request to move the conference communication to the local resources using selective forwarding.

In some further implementations, if a first plurality of conference communications has been set up on the network cloud using selective forwarding, the request to move the conference communication is sent for one of the first plurality of conference communications having been set up on the network cloud for a longer time than all other ones of the first plurality of conference communications.

In some implementations, if the signal received from the monitoring agent indicates an increase of available local resources, if the conference communication has been set up on the network cloud using multipoint control and if local resources are sufficient to serve the conference communication using multipoint control, the method includes sending, from the resource broker to the conference controller, a request to move the conference communication to the local resources using multipoint control.

In some further implementations, if a second plurality of conference communications has been set up on the network cloud using multipoint control, the request to move the conference communication is sent for one of the second plurality of conference communications having been set up on the network cloud before the other ones of the second plurality of conference communications.

In some implementations, if the signal received from the monitoring agent indicates a decrease of available local resources, if the conference communication has been set up on the local resources using selective forwarding and if local resources are no longer sufficient to serve the conference communication using selective forwarding, the method includes sending, from the resource broker to the conference controller, a request to move the conference communication to the network cloud using selective forwarding.

In some further implementations, if the signal received from the monitoring agent indicates a decrease of available local resources, if the conference communication has been set up on the local resources using multipoint control and if local resources are no longer sufficient to serve the conference communication using multipoint control, the method includes sending, from the resource broker to the conference controller, a request to move the conference communication to the network cloud using multipoint control.

In some implementations, the method includes receiving, at the resource broker, from the conference controller, a second message requesting to add a second participant to the conference communication, the second message indicating whether or not a terminal of the second participant supports selective forwarding, and sending, from the resource broker to the conference controller, a reply indicating that the second participant is to be added to the conference communication.

In some further implementations, if the conference communication is ongoing on the network cloud using multipoint control, the method includes adding in the reply that the conference communication is to continue on the network cloud using multipoint control.

In some implementations, if the conference communication is ongoing on the network cloud using selective forwarding and if the second participant's terminal supports selective forwarding, the method includes adding in the reply that the conference communication is to continue on the network cloud using selective forwarding.

In some further implementations, if the conference communication is ongoing on the network cloud using selective forwarding and if the second participant's terminal does not support selective forwarding, the method includes adding in the reply that the conference communication is to continue on the network cloud and that the conference communication is to be changed to use multipoint control.

In some implementations, if the conference communication is ongoing on the network cloud using selective forwarding, if the second participant's terminal does not support selective forwarding and if a second rule allows changing the conference communication, the method includes adding in the reply that the conference communication is to continue on the network cloud and that the conference communication is to be changed to use multipoint control.

In some further implementations, the second rule allows changing the conference communication from selective forwarding to multipoint control if a number of participants to the conference communication meets or exceeds a predetermined threshold.

In some implementations, if the conference communication is ongoing on the network cloud using selective forwarding, if the second participant's terminal does not support selective forwarding and if the second rule does not allow changing the conference communication, the method includes adding in the reply that the conference communication is to continue on the network cloud using selective forwarding.

In some further implementations, if the conference communication is ongoing on the local resources using multipoint control and if the local resources are available to add the second participant to the conference communication, the method includes adding in the reply that the conference communication is to continue on the local resources using multipoint control.

In some implementations, if the conference communication is ongoing on the local resources using multipoint control and if the local resources are not available to add the second participant to the conference communication, the method includes adding in the reply that the conference communication is to be moved to the network cloud and that the conference communication is to continue using multipoint control.

In some further implementations, if the conference communication is ongoing on the local resources using selective forwarding, if the second participant's terminal supports selective forwarding and if the local resources are available to add the second participant to the conference communication, the method includes adding in the reply that the conference communication is to continue on the local resources using selective forwarding.

In some implementations, if the conference communication is ongoing on the local resources using selective forwarding, if the second participant's terminal supports selective forwarding and if the local resources are not available to add the second participant to the conference communication, the method includes adding in the reply that the conference communication is to be moved to the network cloud and that the conference communication is to continue using selective forwarding.

In some further implementations, if the conference communication is ongoing on the local resources using selective forwarding, if the second participant's terminal does not support selective forwarding and if the local resources are available to add the second participant to the conference communication using multipoint control, the method includes adding in the reply that the conference communication is to continue on the local resources and that the conference communication is to be changed to use multipoint control.

In some implementations, if the conference communication is ongoing on the local resources using selective forwarding, if the second participant's terminal does not support selective forwarding and if the local resources are not available to add the second participant to the conference communication using multipoint control, the method includes adding in the reply that the conference communication is to be moved to the network cloud and that the conference communication is to be changed to use multipoint control.

In some further implementations, if the conference communication is ongoing on the local resources using selective forwarding, if the second participant's terminal does not support selective forwarding, if a third rule allows changing the conference communication and if the local resources are available to add the second participant to the conference communication using multipoint control, the method includes adding in the reply that the conference communication is to continue on the local resources and that the conference communication is to be changed to use multipoint control.

In some implementations, if the conference communication is ongoing on the local resources using selective forwarding, if the second participant's terminal does not support selective forwarding, if a third rule does not allow changing the conference communication and if the local resources are available to add the second participant to the conference communication using selective forwarding, the method includes adding in the reply that the conference communication is to continue on the local resources using selective forwarding.

In some further implementations, if the conference communication is ongoing on the local resources using selective forwarding, if the second participant's terminal does not support selective forwarding, if a third rule does not allow changing the conference communication and if the local resources are not available to add the second participant to the conference communication using selective forwarding, the method includes adding in the reply that the conference communication is to be moved to the network cloud and that the conference communication is to continue using selective forwarding.

In some implementations, the third rule allows changing the conference communication from selective forwarding to multipoint control if a number of participants to the conference communication meets or exceeds a predetermined threshold.

In some further implementations, the method includes receiving, at the resource broker, from the conference controller, a third message requesting to remove one of the first participant and a second participant from the conference communication; if the other one of the first participant and the second participant remains in the conference communication, sending, from the resource broker to the conference controller, a reply indicating that the one of the first participant and the second participant is to be removed from the conference communication; and, if none of the first participant and the second participant remains in the conference communication, sending, from the resource broker to the conference controller, a reply indicating that the conference communication is to be terminated.

In some implementations, the conference communication is a video conference.

In some further implementations, the resource broker comprises a video processing controller (VPC).

In some implementations, the conference controller comprises a session initiation protocol (SIP) server.

In some further implementations, the first message requesting to set up a conference communication and replies sent by the resource broker to the conference controller comprise session initiation protocol (SIP) signals.

In some implementations, the local resources are part of a fog network.

In some further implementations, the local resources comprise a first selective forwarding unit (SFU).

In some implementations, the local resources comprise a first multipoint control unit (MCU).

In some further implementations, the network cloud comprises a second selective forwarding unit (SFU).

In some implementations, the network cloud comprises a second multipoint control unit (MCU).

In another aspect, various implementations of the present technology provide a resource broker for assigning resources to conference communications, comprising:

a communication interface adapted to receive messages from and to send replies to a conference controller;

a database adapted to store availability information for local resources; and a processor operatively connected to the communication interface and to the database, the processor being configured to, in response to a first message received at the communication interface requesting to set up a conference communication for a first participant:

verify, in the database, an availability of the local resources;

determine if a terminal of the first participant supports selective forwarding;

if the first participant's terminal supports selective forwarding and if the local resources are available to serve the conference communication using selective forwarding, prepare a reply indicating that the conference communication is to be set up on the local resources using selective forwarding;

if the first participant's terminal does not support selective forwarding and if the local resources are available to serve the conference communication using multipoint control, prepare a reply indicating that the conference communication is to be set up on the local resources using multipoint control;

if the first participant's terminal supports selective forwarding and if the local resources are not available to serve the conference communication using selective forwarding, prepare a reply indicating that the conference communication is to be set up on a network cloud using selective forwarding;

if the first participant's terminal does not support selective forwarding and if the local resources are not available to serve the conference communication using multipoint control, prepare a reply indicating that the conference communication is to be set up on the network cloud using multipoint control; and request the communication interface to send the reply to the conference controller.

In some implementations, the communication interface is further adapted to receive, from a monitoring agent, a signal indicating one of a loading level and an availability state for a local server and the processor is further adapted to update, in the database, one of a current loading level and a current availability state for the local server and to verify the availability of local resources by verifying, in the database, the current loading level and the current availability state of the local server.

In some further implementations, the communication interface comprises a first port for communicating with the conference controller and a second port for communicating with the monitoring agent.

In some implementations, the resource broker further comprises a memory device operatively connected to the processor and configured to maintain information related to ongoing conference communications.

In the context of the present specification, unless expressly provided otherwise, a "terminal", a "SIP server", a "a network cloud", a "cloud media server", a, "fog network", a "fog media server", a "selective forwarding unit", a "multipoint control unit", a "video processing controller" and a "monitoring agent" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "memory device" is intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first rule" and "third rule" is not intended to imply any particular order, type, chronology, hierarchy or ranking (for example) of/between the rules, nor is their use (by itself) intended imply that any "second rule" must necessarily exist in any given situation. Yet as another example, it should be understood that, the use of the terms "first test" and "third test" is not intended to imply, unless specified otherwise, any particular order, type, chronology, hierarchy or ranking (for example) of/between the suggested tests, nor is their use (by itself) intended imply that any "second test" must necessarily exist in any given situation. Further, as is discussed herein in other contexts, reference to a "first" element and a "second" element does not preclude the two elements from being the same actual real-world element. Thus, for example, in some instances, a "second" element and a "third" element may be referring to the same or to distinct information elements.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
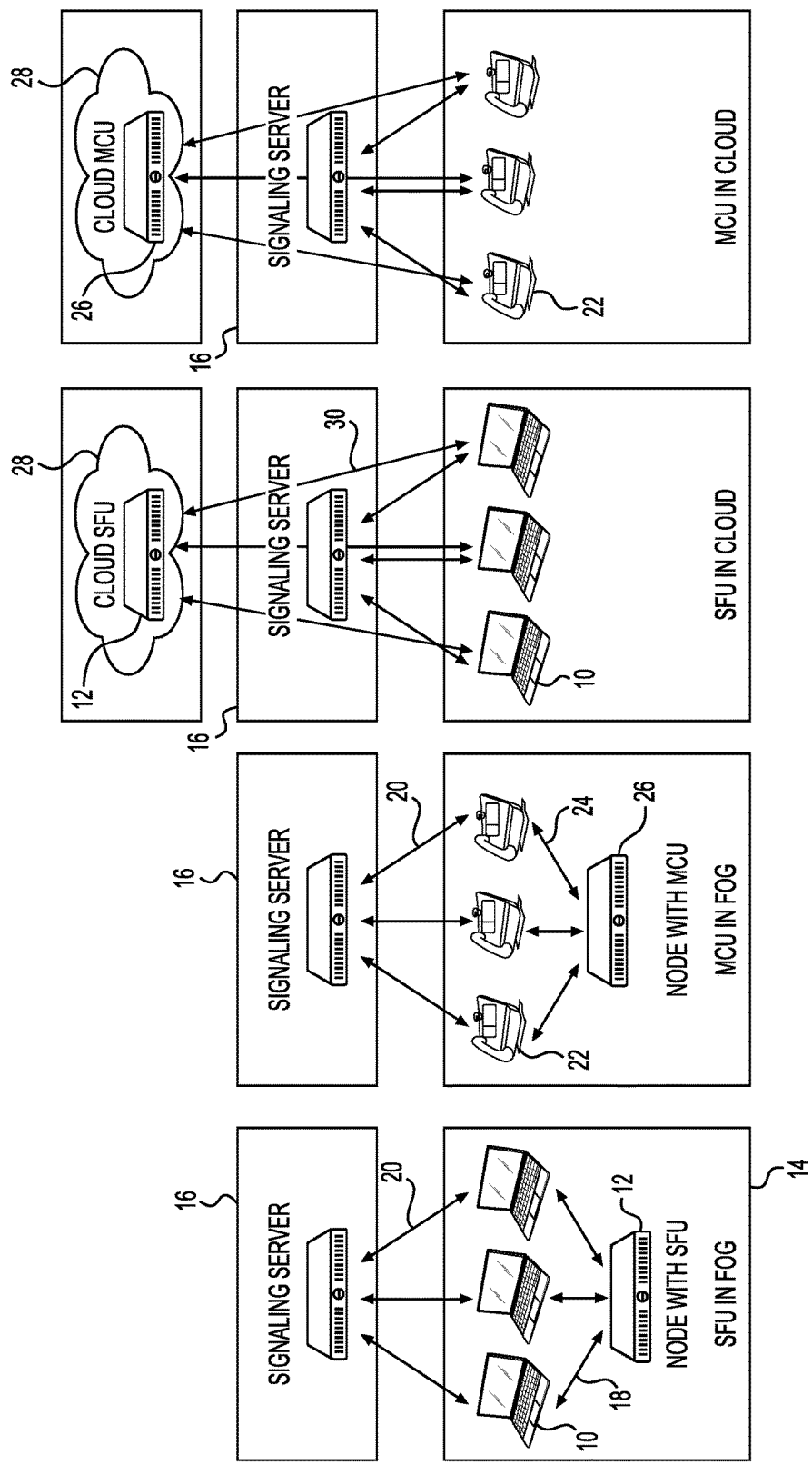
FIGS. 1a, 1b, 1c and 1d illustrate four distinct video conferencing exemplary use cases.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, and the like represent various processes which may be substantially represented in computer-readable media and so executed by a computer or processor, whether or not such computer or processor is explicitly shown.

The functions of the various elements shown in the figures, including any functional block labeled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process operations and/or textual description. Such modules may be executed by hardware that is expressly or implicitly shown.

In the context of the present disclosure, a conference communication may be set up by a first participant and the conference communication may be considered as having been set up and being ongoing before addition of a second participant to the conference communication. The conference communication may also be considered as being ongoing as long as at least one of the participants remains connected even though other participants may have left the conference communication.

Also in the context of the present disclosure, two (2) variables may be considered in order to optimize the use of resources for setting up a conference communication, such as a video conference in a non-limiting example, while at the same time attempting to optimize the quality of experience (QoE) as perceived by participants to the video conference. A first variable relates to the type of connection provided between the participants. A second variable relates to the location of resources that support the video conference.

Addressing this first variable, selective forwarding is favored over multipoint control when terminals of participants to a conference communication such as a video conference (all such terminals, or at least a subset thereof) can support selective forwarding. Addressing then the second variable, using local resources is favored over using network cloud resources when sufficient local resources are available.

With these fundamentals in place, we will now consider some non-limiting examples to illustrate various implementations of aspects of the present technology.

Referring now to the Drawings, FIGS. 1a, 1b, 1c and 1d illustrate four distinct video conferencing use cases.

On FIG. 1a, a number of terminals 10 are connected in a video conference through a SFU 12 located in a fog network 14. A signaling server 16 that may be internal or external to the fog network 14 handles setting up the video conference. Media streams 18 exchanged between the SFU and the terminals require significant bandwidth, but this bandwidth is contained within the fog network. Signaling 20 between the terminals 10 and the signaling server 16 is usually not bandwidth intensive.

FIG. 1b differs from FIG. 1a in that terminals 22 (or at least one of the terminals 22) do not support selective forwarding. Media streams 24 are therefore exchanged between the terminals 22 and a MCU 26 of the fog network 14. It is noted that the use case of FIG. 1b usually requires more bandwidth than the use case of FIG. 1a.

FIG. 1c places the SFU 12 in a network cloud 28. As in the previous use cases, the signaling server 16 may be in the fog network 14 or beyond, for example in the network cloud 28. While the bandwidth of the media streams 30 in this use case is generally similar to the bandwidth of the media streams 18 FIG. 1a, the media streams 30 must be exchanged beyond the confines of the fog network 14.

FIG. 1d places the MCU 26 in the network cloud 28, the location of the signaling server 16 being still of limited relevance. The high bandwidth requirements of multipoint control now extend to communication between the fog network 14 and the network cloud 28.

Though three (3) terminals are illustrated in FIGS. 1a, 1b, 1c and 1d, it is contemplated that smaller or larger numbers of participants may be involved in each video conferencing use case.

Figure 2:
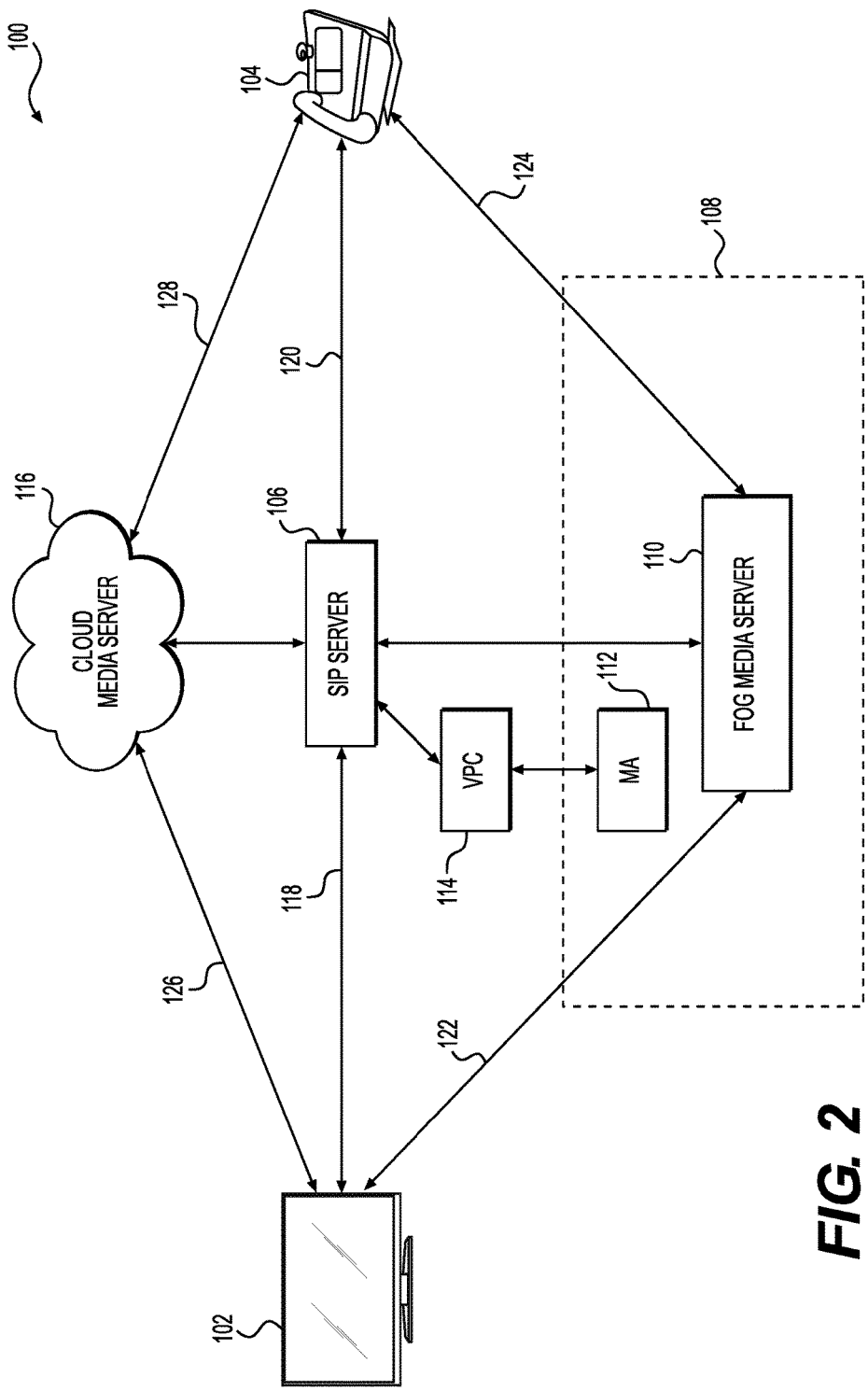
FIG. 2 is a high-level network diagram showing nodes involved in the set-up of video conference communications according to an embodiment.

FIG. 2 is a high-level network diagram showing nodes involved in the set-up of video conference communications. A network 100 connects a first terminal 102 of a first participant with a second terminal 104 of second participant in a video conference. Though two (2) terminals 102 and 104 are shown, the video conference may connect a greater number of terminals. The terminals 102 and 104 may contain similar features and share the same or equivalent capabilities. Alternatively, the terminals 102 and 104, as well as other terminals (not shown) implicated in the video conference, may have different capabilities. Without limitation, either or both of the terminals 102 and 104 may support selective forwarding. Multipoint control of does not generally impose any specific requirement on terminals participating in a video conference, other than being able to send and receive audio and video media streams.

The network 100 includes the following nodes for setting-up and serving the video conference between the terminals 102 and 104: a conference controller such as, without limitation, a signaling interface protocol (SIP) server 106, a fog network 108 that includes at least one fog media server 110 (only one is shown) and a monitoring agent 112, a video processing controller (VPC) 114, and at least one cloud media server 116 (only one is shown) located in a network cloud (not specifically shown).

For privacy and security reasons, the network 100 may locate some of the elements, for example the terminals 102 and 104 and/or the whole or parts of the fog network 108 behind a firewall (not shown). Other conventional techniques may be used to protect these elements from intrusions or to protect the various signalling messages and media streams exchanged within the network 100 from malicious attacks, for example setting up of so-called demilitarized zones (DMZ), addition of session border controllers (SBC) between the SIP server 106 and the fog media server 110, firewalls using interactive connectivity establishment/traversal using relays around network address translation (ICE/TURN), and the like. Such measures are conventional and are not directly related to the teachings of the present disclosure. For these and other reasons, the network 100 may thus comprise other elements that are not shown in order to simplify the illustration.

The SIP server 106 operates as a conference controller. Various commercially available SIP servers can be integrated in the network 100 of FIG. 2.

The fog media server 110 may include one or a plurality of hardware nodes, such as computers, processors, circuit cards and servers, integrating one or more selective forwarding units such as the SFU 12 of earlier Figures, and one or more multipoint control units such as the MCU 26 introduced hereinabove. Without limitation, a same hardware node of the fog media server 110 may integrate at once an instance of the SFU 12 and the MCU 26. In another variant, the SFU 12 and the MCU 26 may be realized as distinct hardware devices of the same or distinct fog media servers 110 present in the fog network 108. In some variants, one SFU 12 may be capable of supporting one video conference session while, in other variants, one SFU 12 may be capable of supporting a plurality of video conference sessions. Likewise, one MCU 26 may be capable of supporting a single video conference session or a plurality of video conference sessions. The present disclosure is not limited to the arrangement as shown on FIG. 2 and various arrangements of the fog media server 110 are contemplated.

The monitoring agent 112 can be realized as a software module of one, several or all of the fog media servers 110, as a hardware component distinct from the fog media server(s) 110, or as a combination. The monitoring agent 112 internally maintains information about current resource usage in the fog media server 110. In more details, the monitoring agent 112 keeps track of loading levels and availability states of various processing entities of the fog media server 110. Generally speaking, a resource is available if it is up and running and if its loading level does not exceed a maximum threshold. For instance, the monitoring agent 112 is aware of the current availability states and loading levels of SFUs 12 and of MCUs 26 in the fog media server(s) 110. The monitoring agent 112 is thus able to evaluate whether the fog media server 110 is, at any given time, capable of accepting one more video conference task using selective forwarding, or to accept one more video conference using multipoint control. In case of failure of some of the SFUs 12, of some of the MCUs 26, or of some of the fog media servers 110, the monitoring agent 112 marks those resources as not currently available. In one variant, the monitoring agent 112 regularly polls the fog media servers 110 to obtain information about current loading levels and availability of their various resources and components. In another variant, the fog media servers 110 forward signals to the monitoring agent 112 when their loading levels change, or when their loading levels rise above or fall below a predetermined threshold. In yet another variant, each fog media server 110 or each resource within each fog media server 110 regularly sends a so-called "heartbeat" message to the monitoring agent 112, the monitoring agent 112 then marking a resource as unavailable if it fails to provide its heartbeat message within a predetermined time period. Various manners for maintaining, in the monitoring agent 112, awareness of the current loading levels and availability states of the resources contained within the fog media servers 110 are thus contemplated.

The monitoring agent 112 forwards information about the current loading levels and availability states of the resources contained in the fog network 108 to the VPC 114. As will be explained in the following passages, the VPC 114 uses this information for setting up and control of video conference sessions.

Figure 3:
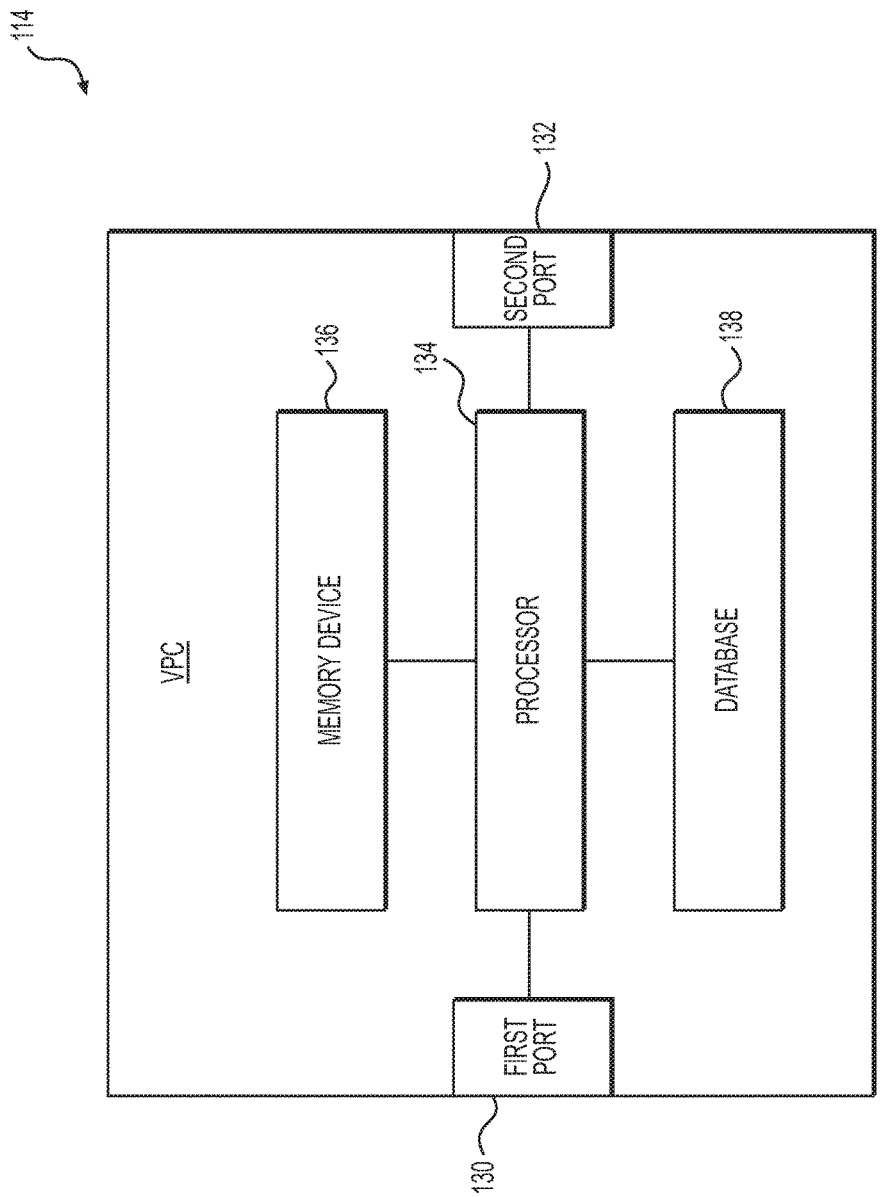
FIG. 3 is a block diagram showing components of a video processing controller according to an embodiment.

FIG. 3 is a block diagram showing components of a video processing controller according to an embodiment. The VPC 114 operates as a resource broker for the video conference. It includes a communication interface including a first port 130 adapted to communicate with the SIP server 106 and a second port 132 adapted to communicate with the monitoring agent 112. The first port 130 supports the signaling interface protocol (SIP). The second port 132 may be configured to communicate via SIP signals or may alternatively rely on another protocol to communicate with the monitoring agent 112. In a variant, the first and second ports 130 and 132 may be integrated as one common port. In some embodiments, the VPC 114 is physically distinct from at least the SIP server 106 and the first port 130 comprises a hardware port adapted to exchange SIP signals with the SIP server 106 on a physical communication channel (not shown). The VPC 114 comprises one or a plurality of processors 134 (one processor is shown in order to simplify the illustration) operatively connected to the first and second ports 130 and 132, to a memory device 136, and to a database 138. The memory device 136 generally maintains information about ongoing transactions, for example for temporary storage of information related to requests received at the first port 130 from the SIP server 106 for setting up or modifying a video conference, and current states of ongoing video conferences. The database 138 generally maintains information received at the second port 132 about current loading levels and availability states of one or more fog media servers 110 and of their components, such as SFUs 12 and MCUs 26 for example. The VPC 114 may be integrated in the fog network 108 and, in some embodiments, may be physically integrated with another hardware component such as for example the monitoring agent 112. In other embodiments, the VPC 114 may be implemented as a standalone hardware node, within or outside the confines of the fog network 108. At least when the VPC 114 is constructed as a standalone hardware node, the second port 132 includes a hardware port. Without loss of generality, where the present disclosure presents features executed by the VPC 114, these features are controlled by the processor 134 in cooperation with other components of the VPC 114.

Referring again to FIG. 2, according to implementations of the present technology, to initiate a video conference or to join a video conference already in progress, one of the terminals 102, 104 sends a request on a signaling path 118 or 120 to the SIP server 106, the request including capability information of the terminal 102 or 104 indicating whether or not the requesting terminal supports selective forwarding. The SIP server 106 forwards this request and capability information to the VPC 114. The VPC 114 determines whether the video conference should be set up (or should continue, if already ongoing) using selective forwarding or using multipoint control, and determines whether the video conference should be served by the fog network 108 or by a cloud media server 116. The VPC 114 sends a reply with this determination to the SIP server 106 which, in turns, informs the requesting terminal 102 or 104. Thereafter, media streams including audio and video signals are exchanged between the terminal 102 or 104 and one of the fog network 108 or the cloud media server 116.

As an illustration, if the terminals 102 and 104 are both connected in a video conference session served by the fog network 108, media streams 122 and 124 are exchanged between these terminals 102 and 104 through the fog media server 110. Within the fog media server 110, these media streams 122 and 124 are selectively forwarded between the terminals 102 and 104 by a SFU 12, or combined for the benefit of both terminals 102 and 104 by a MCU 26. If the terminals 102 and 104 are both connected in a video conference session served by the network cloud, media streams 126 and 128 are exchanged between these terminals 102 and 104 through network cloud and handled by a SFU 12 or by a MCU 12 of the cloud media server 116.

Figure 4:
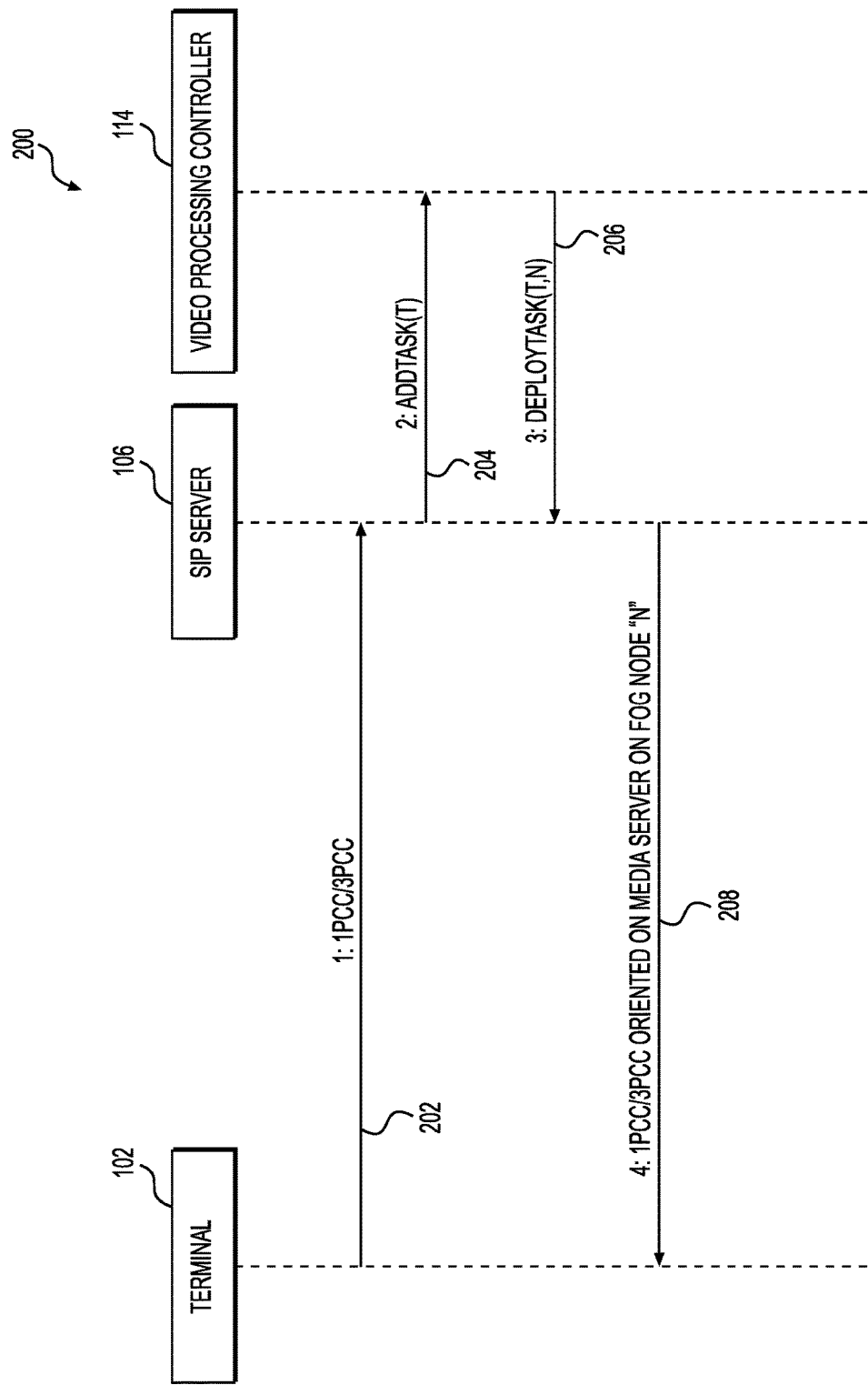
FIG. 4 is a signalling diagram showing messages related to setting up a video conference on a fog network according to an embodiment.

FIG. 4 is a signalling diagram showing messages related to setting up a video conference on a fog network. The signaling diagram shows a sequence 200 of signals exchanged between one of the terminals 102 or 104 (only terminal 102 is shown for simplicity), the SIP server 106 and the VPC 114. Though the sequence 200 shows a series of SIP signals, use of other signaling protocols is also contemplated and SIP signals are presented for illustration purposes, without limiting the present disclosure. The terminal 102 operated by a participant desiring to participate in a video conference sends a SIP signal 202 to the SIP server 106, the SIP signal 202 requesting the set-up of a new video conference. The SIP signal 202 indicates that video conference set-up is requested in a first person call control (1PCC) mode or in a third party call control (3PCC) mode and indicates whether the requesting terminal supports selective forwarding. Whether the request is made in 1PCC mode or in 3PCC mode has no impact on events occurring at the VPC 114, the SIP server 106 handles this call control mode in a conventional manner. The SIP server 106 sends an addTask (T) signal 204, which is a SIP signal, to the VPC 114, forwarding information elements received in the SIP signal 202, the "T" being a pointer designating the task requested by the terminal having send the SIP signal 202. The VPC 114 determines whether local resources are available in the fog network 108 to serve the video conference according to the capabilities of the terminal 102 to support selective forwarding. In more details, if the terminal 102 supports selective forwarding, the VPC 114 consults its database 138 to determine if an SFU 12 or an equivalent resource of the fog network 108 is currently available. If the terminal 102 does not support selective forwarding, the VPC 114 consults its database 138 to determine if an MCU 26 or an equivalent resource of the fog network 108 is currently available. As illustrated on FIG. 4, the VPC 114 determines that a node "N" within the fog network 108, for example an instance "N" of a SFU 12 in the fog media servers 110, is available to set up the video conference. The VPC 114 sends a deployTask(T,N) signal 206, which is a SIP signal, to the SIP server 106, indicating that the node "N" is assigned to serve the task "T". The SIP server 106 responds to the terminal 102 with a SIP signal 208 to indicate that the video conference should be served on the node "N" of the for network 106. Alternatively, or in addition, additional SIP signals (not shown) may be exchanged between the terminal 102 and the SIP server 106 for setting up the video conference. Though not specifically shown on FIG. 4, the VPC 114 has selected the node "N" to serve the video conference in accordance with the indication forwarded by the SIP server 106 regarding the capability of the terminal 102 to support selective forwarding. Hence, if the addTask(T) signal 204 indicates that the terminal 102 does support selective forwarding, the VPC 114 has chosen the node "N" to serve the video conference because that node "N" includes a MCU 26 or equivalent capabilities.

Of course, in an embodiment, the deployTask(T,N) signal 206 may further include an explicit indication that the video conference should be set up using selective forwarding or multipoint control.

The signaling sequence 200 is also applicable to a large extent in a case where the participant using the terminal 102 desires to join a video conference that is already ongoing. Depending on the particular circumstances, the VPC 114 may not need to determine whether sufficient resources are available since, for some use cases, the addition of the terminal 102 to the ongoing video conference does not impose any additional load on the resources already allocated to that video conference. In such cases, the deployTask (T,N) signal 206 indicates the node "N" that is already handling the ongoing video conference.

Figure 5:
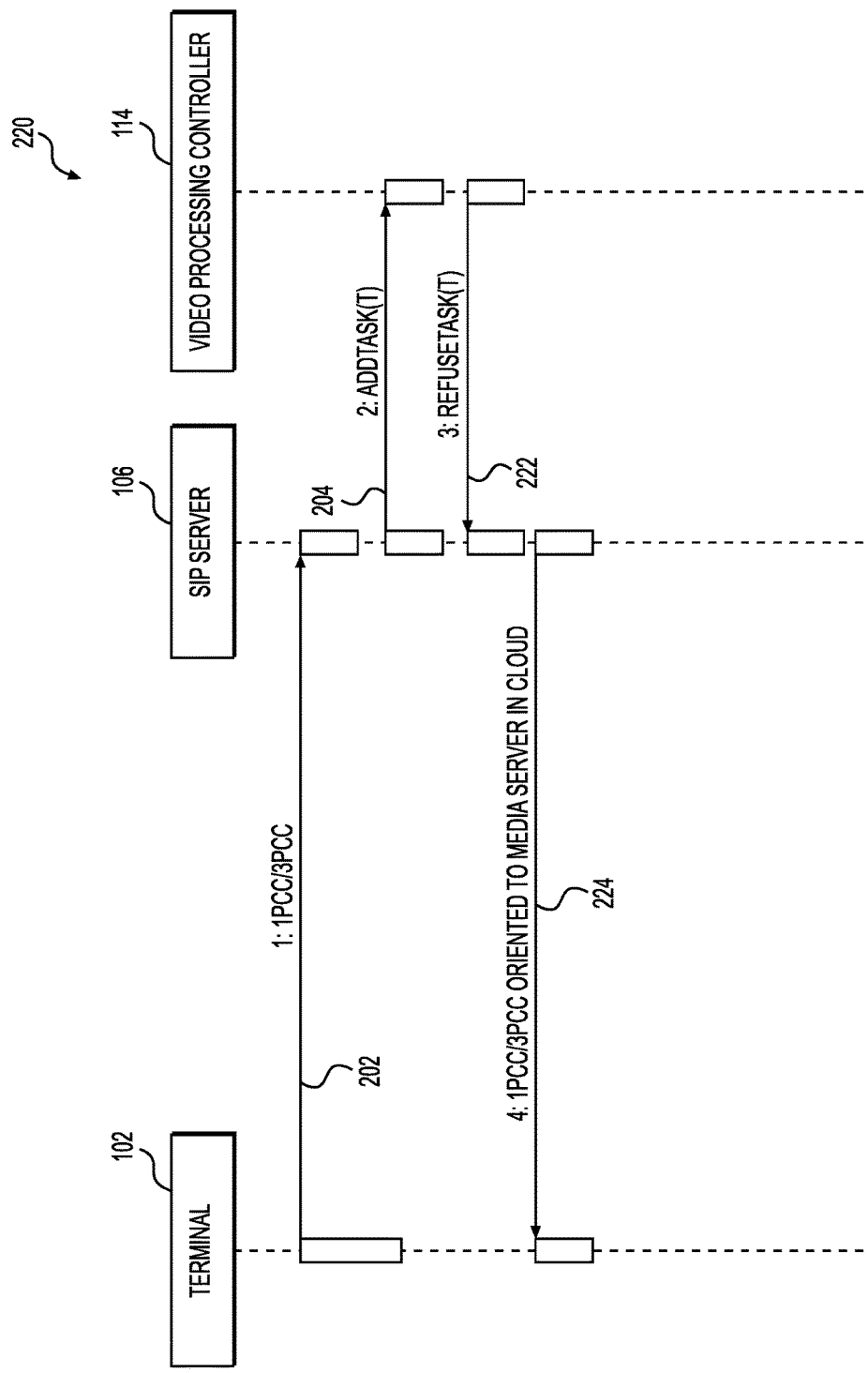
FIG. 5 is a signalling diagram showing messages related to setting up a video conference on a network cloud according to an embodiment.

FIG. 5 is a signalling diagram showing messages related to setting up a video conference on a network cloud. The signaling diagram shows a sequence 220 that is similar to the sequence 200 of FIG. 4, so only the differences between these sequences will now be described. In this sequence 220, having received the addTask(T) signal 204, the VPC 114 determines that there are currently no available resources in the fog network 108 to serve the requested video conference. Whether components of the fog network 108 related to the capabilities of the terminal 102 are currently overloaded or experiencing some failure condition, the VPC 114 sends a refuseTask(T) signal 222, which is a SIP signal, to the SIP server 106. The refuseTask(T) signal 222 indicates that the fog network 108 cannot support the video conference and may also indicate whether the video conference should be set up using selective forwarding or multipoint control. In turn, the SIP server 106 sends a SIP signal 224 to the terminal 102 indicating that the video conference should be set up on the network cloud. Though not shown on FIG. 5, the SIP signal 224 may indicate whether the video conference should be set up using selective forwarding or multipoint control and may further indicate which cloud media server 116 should serve the video conference. Alternatively, or in addition, additional SIP signals (not shown) may be exchanged between the terminal 102 and the SIP server 106 for setting up the video conference.

Figure 6:
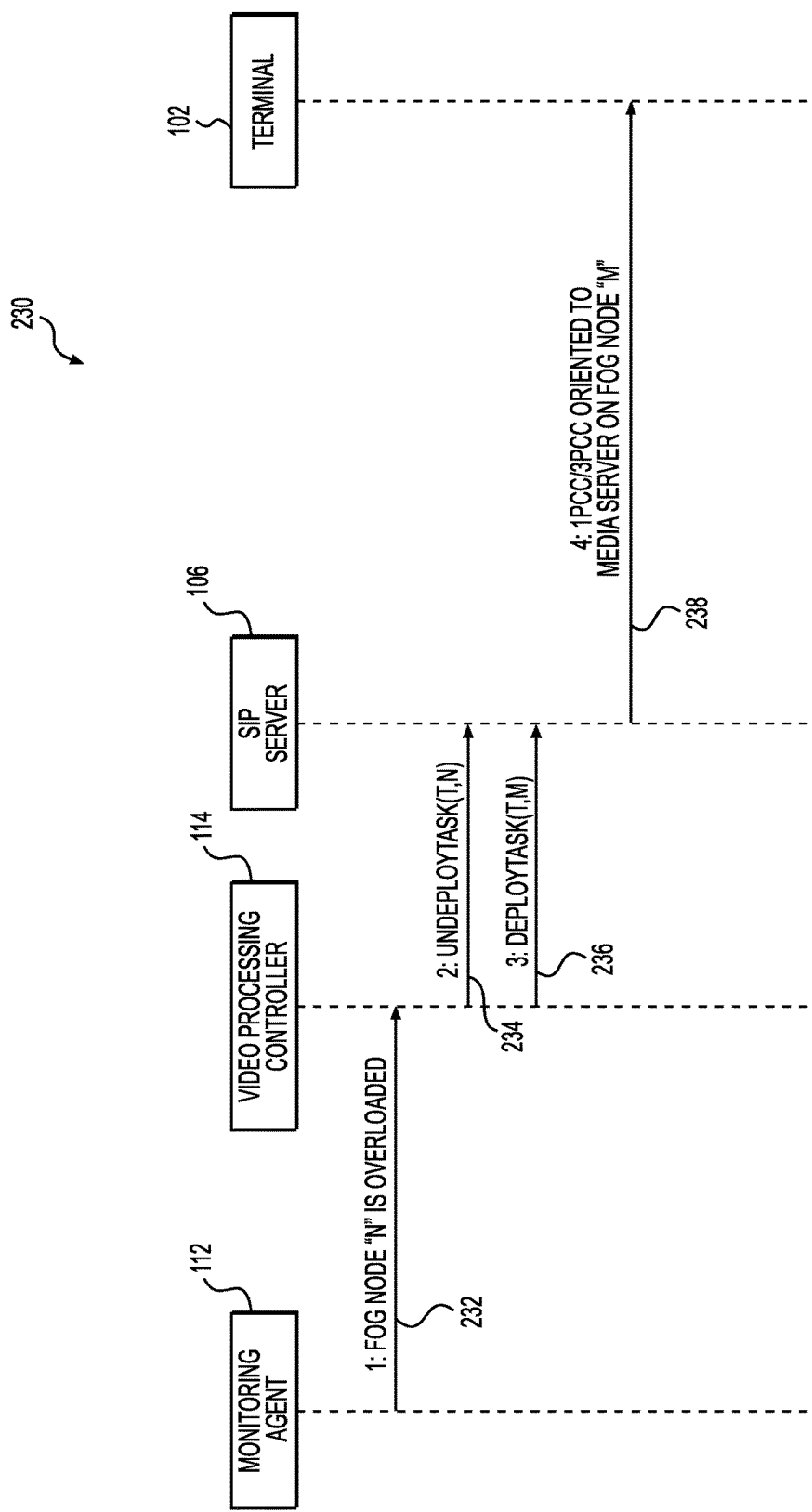
FIG. 6 is signalling diagram showing messages related to a change of availability of resources in the fog network according to an embodiment.

FIG. 6 is signalling diagram showing messages related to a change of availability of resources in the fog network. For illustration purposes, a sequence 230 takes place some time after the establishment of a video conference involving the terminal 102 and the node "N" of the fog network 108, as recited in the description of the sequence 200, in FIG. 4. The monitoring agent 112 detects or is otherwise informed that the node "N", which was earlier assigned to support the video conference, has become overloaded; similar events would follow in case of a failure condition at the node "N". The monitoring agent 112 sends a signal 232 to inform the VPC 114 of this condition. The signal 232 may be a SIP signal, a proprietary signal according to a proprietary protocol shared by the monitoring agent 112 and the VPC 114, or a signal according to a standard protocol supported by the monitoring agent 112 and by the VPC 114. The VPC 114 sends an undeployTask(T,N) signal 234, which is a SIP signal, to the SIP server 106. In the example of FIG. 4, the SIP server 106 determines that a node "M" having similar capabilities as the node "N" is available fog network 108 to continue the ongoing video conference. Consequently, the VPC 114 also sends a deployTask(T,M) signal 236 to the SIP server 106. Having received these last two (2) signals, the SIP server 106 sends a SIP signal 238 to the terminal 102, indicating that the video conference should now continue being served by the node "M".

Though not shown on FIG. 6, the VPC 114 having received the signal 232 may determine that the fog network 108 no longer has any resource to support continuation of the ongoing video conference. It may happen that the fog network 108 has no resource at all or that the fog network 108 has no resource for supporting the type of video conference as initially established, whether the video conference was set up using selective forwarding or multipoint control. In such cases, rather than sending the deployTask (T,M) signal 236 to the SIP server 106, the VPC 114 sends a refuseTask(T) signal (not shown, but similar to the refuseTask(T) signal 222 of FIG. 5) to the SIP server 106. In turn, the SIP server 106 sends a SIP signal (not shown, but similar to the SIP signal 224 of FIG. 5) to the terminal 102 to redirect the video conference to the network cloud.

Figure 7:
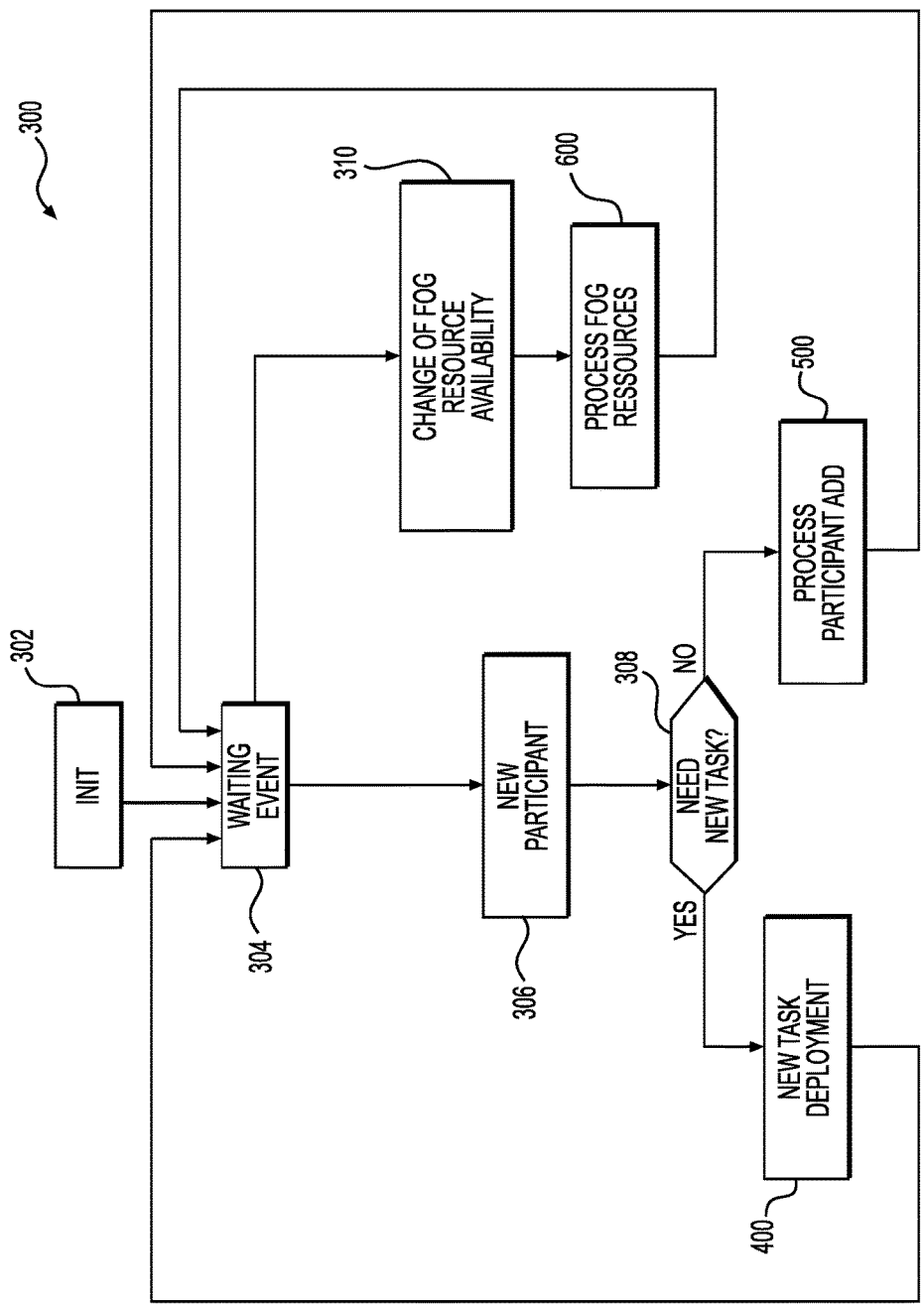
FIG. 7 is a flowchart summarizing operations of a conference control method implemented in the video processing controller according to an embodiment.

FIG. 7 is a flowchart summarizing operations of a conference control method implemented in the video processing controller. A sequence 300 shows operations that occur at the VPC 114. Some of the operations are in the form of subroutines (meta-operations) that are described in more details in the following drawings. Some of the operations may be executed in variable order or concurrently. In some embodiments, some operations may be optional. The VPC 114 is initially booted at operation 302 and, becoming operational, waits for a next event at operation 304. Though a variety of events may occur, the sequence 300 as illustrated only presents the main events related to control of video conferences.

One possible event is when the VPC 114 receives an addTask(T) signal 204 at operation 306. The addTask(T) signal 204 is received from the SIP server 106 because a new participant has requested setting up of a video conference or because a terminal has requested to join an ongoing video conference. The VPC 114 evaluates information elements contained in the addTask(T) signal 204 at operation 308. If a new video conference task needs to be set up, the sequence 300 will continue in subroutine 400, in which a new video conference task will be deployed. If the terminal is joining an ongoing video conference, the sequence 300 will continue in subroutine 500, in which the new participant will be added to the ongoing video conference.

One other event that may occur while the VPC 114 is waiting at operation 306 is the receipt at operation 310, of a signal 232 from the monitoring agent 112 indicating a change of availability of resources in the fog network 108. The signal 232 may indicate that one specific resource, for example one SFU 12 or one MCU 26, is overloaded or is experiencing a failure condition. The signal 232 may indicate that a group of resources is no longer available; for example a fog media server 110 comprising a plurality of SFUs 12 and/or a plurality of MCUs 26 may be overloaded or not available. The signal 232 may also indicate that previously unavailable or overloaded resources have now become available. In response to the signal 232, the sequence 300 will continue in subroutine 600, in which the information related to fog network resources will be processed.

In one embodiment, the VPC 114 returns to operation 304 and waits for a next event at the conclusion of any one of the subroutines 400, 500 or 600. In another embodiment, the VPC 114 is capable of handling a plurality of concurrent events and continuously waits for a next event at operation 304 during and after the execution of the subroutines 400, 500 and 600, the VPC 114.

Figure 8:
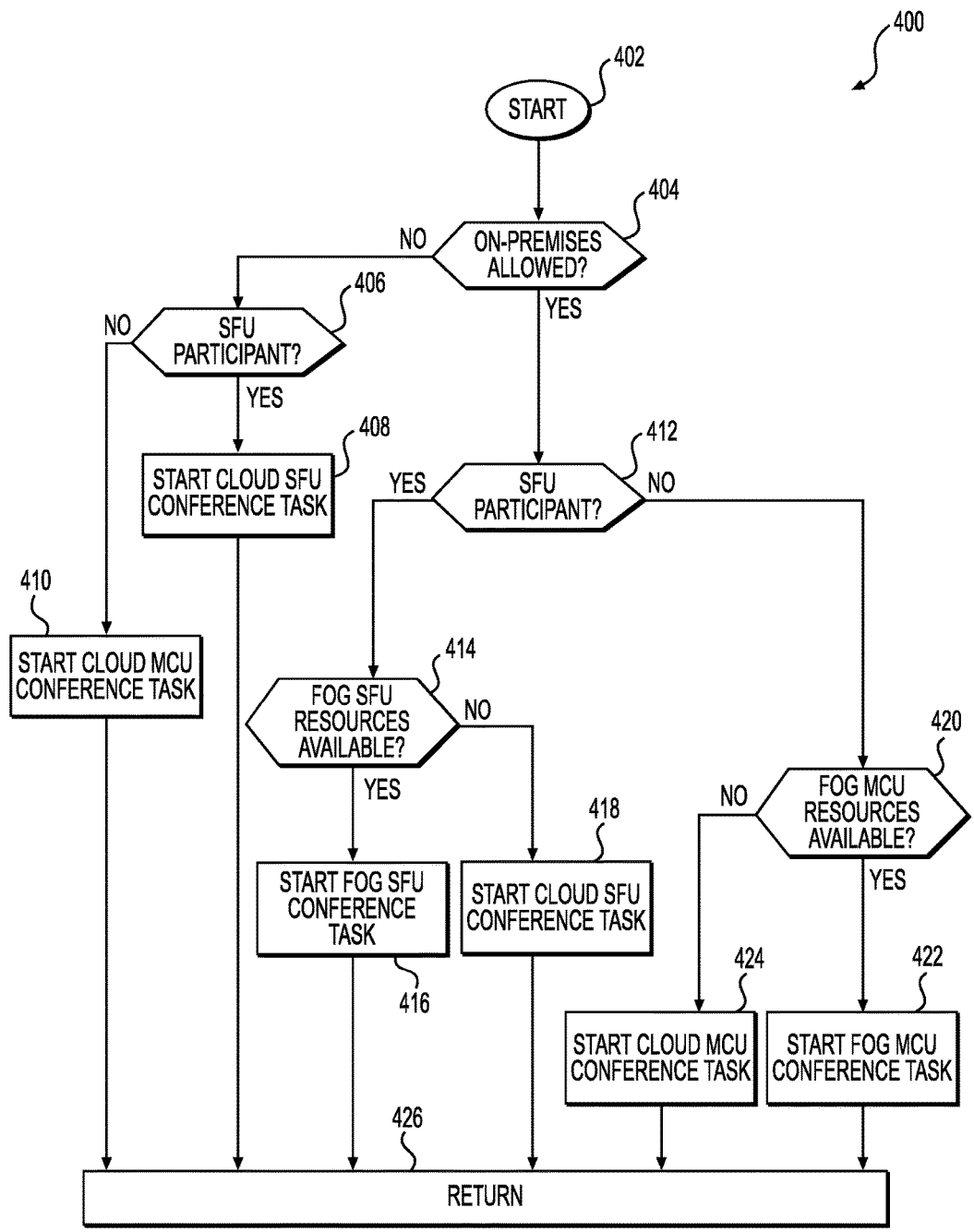
FIG. 8 is a flowchart illustrating operations of the conference control method of FIG. 7 for setting up a conference communication.

FIG. 8 is a flowchart illustrating operations of the conference control method of FIG. 7 for setting up a conference communication. Operations of the subroutine (meta-operation) 400 for setting up a new video conference task as a result of a participant request will now be described. In the VPC 114, the processor 134 consults and updates its memory device 136 as required to obtain and maintain the current state of ongoing video conference tasks. The processor 134 consults its database 138 to obtain the current loading levels and availability states of the various resources in the fog network 108. Having started at operation 402, the subroutine 400 continues in a first test at operation 404, in which the VPC 114 may verify a first rule, or internal policy, indicating whether or not the fog network 108 allows using its local resources for setting up the video conference.

If the first test of operation 404 indicates that the first rule disallows using local resources, the video conference should be set up on the network cloud. In that case, the VPC 114 verifies in a second test 406 if the terminal of the participant supports selective forwarding. If the result of this second test is positive, the VPC 114 responds to the SIP server 106, at operation 408, indicating that the video conference task should be set up on the network cloud using selective forwarding by sending the refuseTask(T) signal 222. If the result of the second test made at operation 406 is negative, the VPC 114 responds to the SIP server 106, at operation 410, indicating that the video conference task should be set up on the network cloud using multipoint control, also by sending the refuseTask(T) signal 222.

If the first test of operation 404 indicates that using local resources is allowed, or in embodiments that do not include this first test, the process continues with a third test at operation 412 where VPC 114 verifies if the terminal of the participant supports selective forwarding. If the result of this third test is positive, the VPC 114 uses a fourth test at operation 414 to verify whether selective forwarding resources, for example an SFU 12, are available in the fog network 108 to support the new video conference task. If that fourth test is positive, the VPC 114 responds to the SIP server 106, at operation 416, indicating that the video conference task should be set up on the fog network 108 using selective forwarding by sending the deployTask(T,N) signal 206, in which "N" designates the available selective forwarding resource in the fog network 108. If no selective forwarding resource is available, the VPC 114 responds to the SIP server 106, at operation 418, indicating that the video conference task should be set up on the network cloud using selective forwarding by sending the refuseTask(T) signal 222.

Additional cases follow where the first test of operation 404 (if implemented) allows using fog network resources to set up the new video conference task and where the third test of operation 412 reveals that the terminal of the new participant does not support selective forwarding. In that case, in a fifth test of operation 420, the VPC 114 verifies whether multipoint control resources, for example an MCU 26, are available in the fog network 108 to support the new video conference task. If that fifth test is positive, the VPC 114 responds to the SIP server 106, at operation 422, indicating that the video conference task should be set up on the fog network 108 using multipoint control by sending the deployTask(T,N) signal 206, in which "N" now designates the available multipoint resource in the fog network 108. If no multipoint control resource is available, the VPC 114 responds to the SIP server 106, at operation 424, indicating that the video conference task should be set up on the network cloud using multipoint control by sending the refuseTask(T) signal 222.

After any one of the operations 408, 410, 416, 418, 422 or 424, the subroutine 400 ends at operation 426 by returning to the sequence 300.

The order of some of the operations of the subroutine 400 may be modified without departing from the present disclosure. For example, in an embodiment, the capability of the terminal of the participant to support selective forwarding, which is verified in the first and third tests of operations 404 and 412, could be verified in a common test before verifying the first rule of operation 404.

In an embodiment, the first rule is configurable by an operator of the VPC 114, for example based on various business-related, security-related or reliability-related reasons.

The subroutine 400 as illustrated is constructed to that the following order of priority prevails, in descending order:
  a. Selective forwarding in the fog network
  b. Selective forwarding in the network cloud;
  c. Multipoint control in the fog network;
  d. Multipoint control in the network cloud.

It may be observed that, when the fourth test of operation 414 determines that no selective forwarding resources are available in the fog network 108, the video conference task is set up on the network cloud using selective forwarding. In another embodiment, the above priorities 'b' and 'c' may be interchanged by adapting the subroutine 400 so that, when the result of the fourth test of operation 414 is negative, the process continues with the fifth test of operation 420. This could allow setting up the new video conference task on the fog network 108, in multipoint control mode if this is considered preferable by some network owners. It would also be possible, in this embodiment, to add an additional test so that the process may continue at operation 418 in case the result of the fifth test of operation 420 is negative when the fifth test has been executed following a negative result of the fourth test.

In an embodiment, the fog network 108 includes some resources, for example SFUs, which are dedicated to selective forwarding, other resources, for example MCUs, being dedicated to multipoint control. In such case, the fourth test of operation 414 and the fifth test of operation 420 may provide independent results, depending on the types of ongoing video conferences and depending on possible failure conditions of some hardware devices within the fog network 108. In another embodiment, multi-purpose resources, for example processors, may be capable of operating in both selective forwarding and multipoint control modes. In that embodiment, the fourth test of operation 414 and the fifth test of operation 420 may combined in a single test that may possibly be executed before the third test of operation 412.

Figure 9:
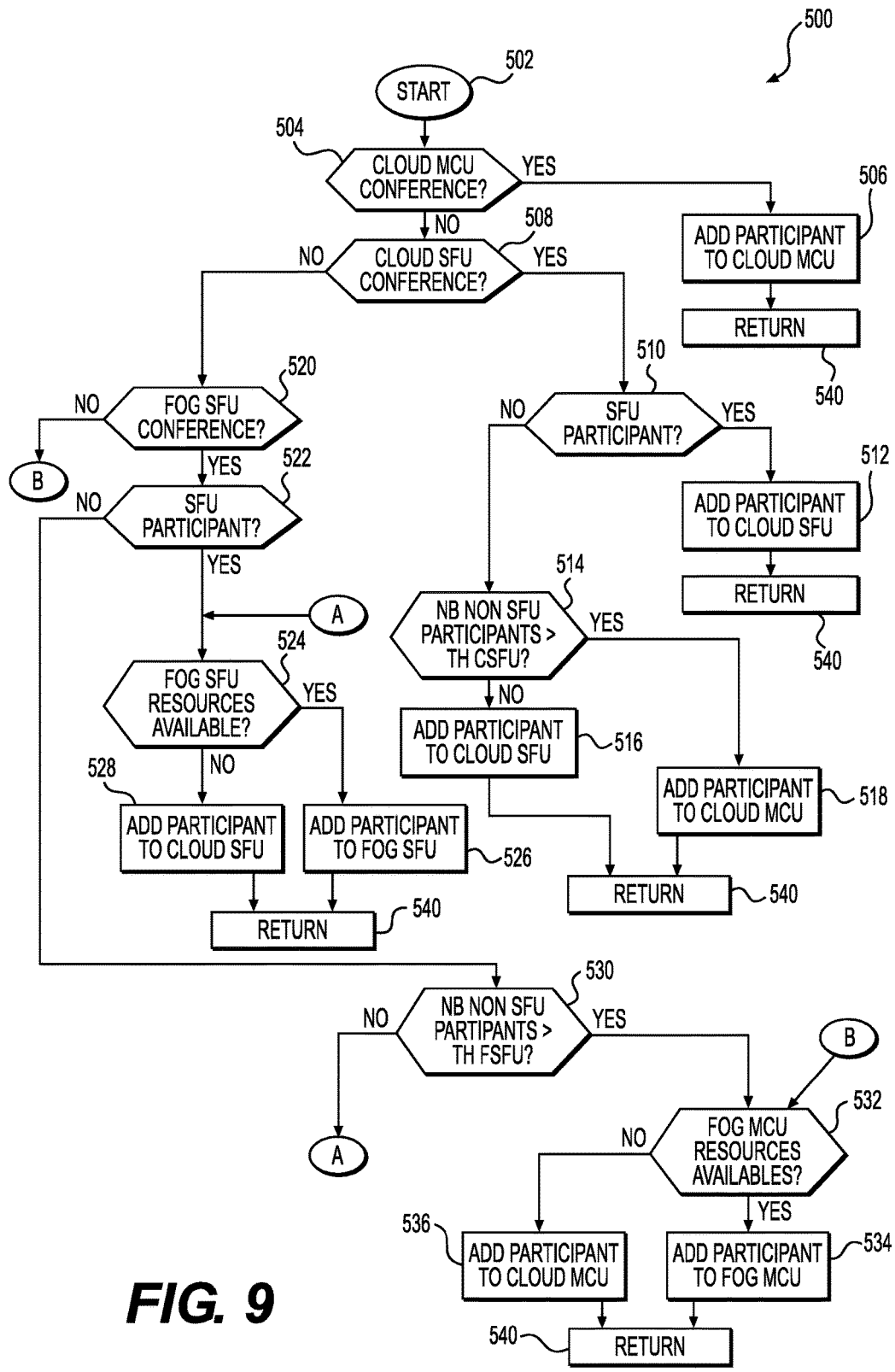
FIG. 9 is a flowchart illustrating operations of the conference control method of FIG. 7 for adding a participant to a conference communication.

FIG. 9 is a flowchart illustrating operations of the conference control method of FIG. 7 for adding a participant to a conference communication. Operations of the subroutine (meta-operation) 500 for adding a new participant to an ongoing video conference will now be described. In the VPC 114, the processor 134 consults and updates its memory device 136 as required to obtain and maintain the current state of ongoing video conference tasks. The processor 134 consults its database 138 to obtain the current loading levels and availability states of the various resources in the fog network 108. Having started at operation 502, the subroutine 500 continues in a first test at operation 504, in which the VPC 114 verifies if the ongoing video conference is currently held using multipoint control on the network cloud. If the result of this first test is positive, the VPC 114 responds to the SIP server 106, at operation 506, indicating that the video conference task should continue on the network cloud using multipoint control by sending the refuseTask(T) signal 222, this signal specifying use of a MCU. If the result of the first test at operation 504 is negative, the VPC 114 then executes a second test, at operation 508, to determine if the ongoing video conference is currently held using selective forwarding on the network cloud. If the result of this second test is positive, the VPC 114 verifies in a third test of operation 510 whether the new participant has a terminal that supports selective forwarding. If the result of this third test is positive, the VPC 114 responds to the SIP server 106, at operation 512, indicating that the video conference task should continue on the network cloud using selective forwarding by sending the refuseTask(T) signal 222, this signal specifying use of a SFU.

If the result of the third test of operation 510 indicates that the terminal of the new participant does not support selective forwarding, in an embodiment, the ongoing video conference may be unconditionally changed from the ongoing selective forwarding mode to the multipoint control mode. However, in another embodiment, a second rule, or internal policy, may be verified by the VPC 114 at operation 514 to determine whether additional conditions for changing the control mode of an ongoing video conference. In a particular implementation of this second rule, a threshold for a number of participants that do not support selective forwarding is verified in a fourth test at operation 514. If the threshold is not exceeded at operation 514, the ongoing video conference should continue with selective forwarding, still on the network cloud. To this end, the VPC 114 responds to the SIP server 106, at operation 516, indicating that the video conference task should continue on the network cloud using multipoint control by sending the refuseTask(T) signal 222, this signal specifying use of a SFU. If, as a result of adding the new participant, the threshold of the fourth test is exceeded (or if the second rule is not implemented in the VPC 114), the ongoing video conference should continue with multipoint control instead of selective forwarding, still on the network cloud. To this end, the VPC 114 responds to the SIP server 106, at operation 518, indicating that the video conference task should continue on the network cloud using multipoint control by sending the refuseTask(T) signal 222, this signal specifying use of a MCU. It is observed that the second rule can be made to have no effect by setting the threshold to zero (0), in which case adding the new participant that does not support selective forwarding would necessarily cause the threshold to be exceeded when executing operation 514. If is also observed that if the new participant that does not support selective forwarding is added to the ongoing video conference and if that conference continues in selective forwarding mode, the new participant may receive some, but usually not all of the media streams of the video conference.

Returning to the second test of operation 508, if the result of that test is negative, the ongoing conference is not held on the network cloud; it is therefore ongoing using one of the fog network resources. A fifth test is executed by the VPC 114 at operation 520, to determine whether the ongoing video conference is currently held using selective forwarding on the fog network 108. If the result of this fifth test is positive, the VPC 114 verifies in a sixth test of operation 522 whether the new participant has a terminal that supports selective forwarding. If the result of the sixth test is positive, the ongoing video conference may continue on the fog network 108 using selective forwarding, on the condition that the fog network 108 has sufficient selective forwarding resources. A seventh test determines at operation 524 whether or not resources are available in the fog network 108 to add the new participant to the ongoing video conference using selective forwarding. If a result of the seventh test is positive, the VPC 114 responds to the SIP server 106, at operation 526, indicating that the ongoing video conference should continue on the fog network 108 using selective forwarding by sending the deployTask(T,N) signal 206, in which "N" designates the available selective forwarding resource of the fog network 108. If the seventh test of operation 524 reveals that the fog network 108 does not have sufficient resources to add the new participant to the ongoing selective forwarding video conference, the video conference is to be moved to the network cloud. In that case, the VPC 114 responds to the SIP server 106, at operation 528, indicating that the ongoing video conference should be moved to the network cloud using selective forwarding by sending the refuseTask(T) signal 222.

If the sixth test of operation 522 indicates that the new participant's terminal does not support selective forwarding, a third rule, if present, may impose additional conditions for changing the control mode of an ongoing video conference. To this end, an eighth test, similar to the above described fourth test, may be executed at operation 530 to determine if the same or another threshold for the number of participants that do not support selective forwarding would be exceeded as a result of adding the new participant. If so, including in cases where the third rule does not apply (the relevant threshold being for example set to zero (0)), the ongoing video conference should continue with multipoint control instead of selective forwarding, either on the fog network 108 or on the network cloud. To this end, following a positive result of the eighth test, the VPC 114 executes a ninth test at operation 532 to determine whether or not resources are available in the fog network 108 to add the new participant to the ongoing video conference using multipoint control. If a result of the ninth test is positive, the VPC 114 responds to the SIP server 106, at operation 534, indicating that the ongoing video conference should continue on the fog network 108, now using multipoint control, by sending the deployTask(T,N) signal 206, in which "N" designates the available multipoint control resource of the fog network 108. If the ninth test of operation 532 reveals that the fog network 108 does not have sufficient resources to add the new participant to the ongoing video conference using multipoint control, the video conference is to be moved to the network cloud. In that case, the VPC 114 responds to the SIP server 106, at operation 536, indicating that the ongoing video conference should be moved to the network cloud and should now be using multipoint control by sending the refuseTask(T) signal 222.

Returning to the eighth test of operation 530, if the threshold is not exceeded, the ongoing video conference should continue with selective forwarding, still on the fog network 108, the process continuing with the seventh test of operation 524, as described hereinabove.

Returning to the fifth test of operation 520, if the ongoing video conference is currently held in multipoint control on the fog network 108, the process continues with the ninth test at operation 532, as described hereinabove.

After any one of the operations 506, 512, 516, 518, 526, 528, 534 or 536, the subroutine 500 ends at operation 540 by returning to the sequence 300.

In an embodiment, the third rule is configurable by the operator of the VPC 114.

Some of the operations of the subroutine 500 may be combined or executed in variable order. In a non-limiting example, operations 506, 518 and 536 are similar and may be executed by the same software lines in the VPC 114.

As in the case of setting up a new video conference task, as described in the foregoing description of FIG. 8, the subroutine 500 may be adapted to change the order of priority. For example, when the seventh test of operation 524 determines that the fog network 108 does not have sufficient resources to add a new participant to an ongoing selective forwarding video conference, instead of moving to operation 528 for moving the video conference to the network cloud using selective forwarding, an attempt could be made to alter the video conference to continue on the fog network 108 using multipoint control. To this end, a negative result of the fourth test of operation 524 could be followed by the ninth test of operation 532.

Figure 10:
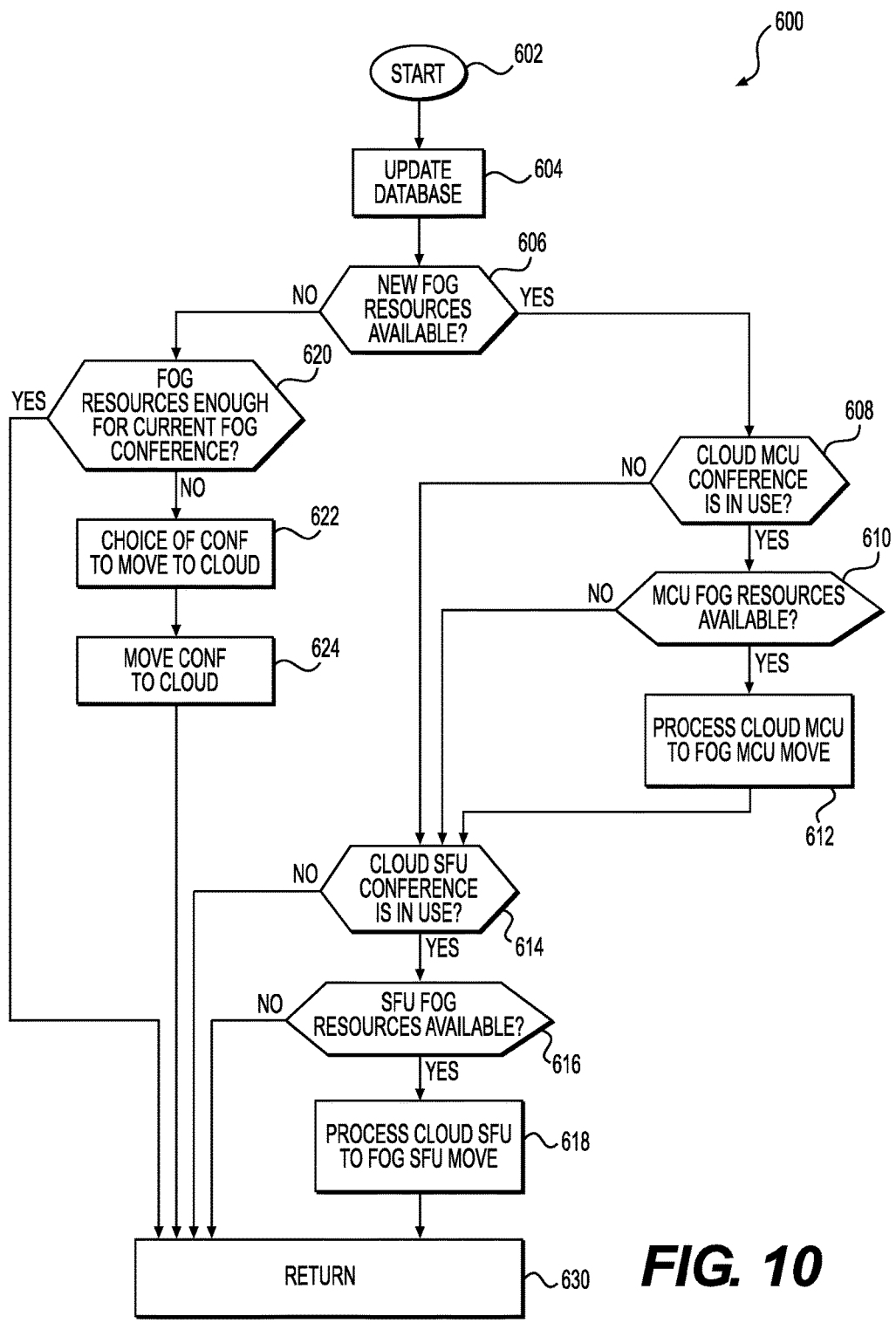
FIG. 10 is a flowchart illustrating operations of the conference control method of FIG. 7 for modifying a conference communication in response to a change of availability of resources in the fog network.

FIG. 10 is a flowchart illustrating operations of the conference control method of FIG. 7 for modifying a conference communication in response to a change of availability of resources in the fog network. Operations of the subroutine (meta-operation) 600 for treating an indication of a change of availability of resources in the fog network 108 will now be described. In the VPC 114, the processor 134 consults and updates its memory device 136 as required to obtain and maintain the current state of ongoing video conference tasks. The processor 134 consults and updates its database 138 to maintain the current loading levels and availability states of the various resources in the fog network 108. Having started at operation 602, the subroutine 600 continues at operation 604 in which the VPC 114 uses information elements received in the signal 232 to update its database 138 so that the VPC 114 is aware of the current loading levels and availability states of the resources in the fog network 108. Then, the VPC 114 determines in a first test at operation 606 whether new fog resources have become available. If the result of the first test is positive, the VPC 114 verifies, in a second test of operation 608, if at least one ongoing video conference is currently being held on the network cloud using multipoint control. If the result of the second test is positive, the VPC 114 performs a third test at operation 610 to determine if a multipoint control resource has become available in the fog network 108. If the result of the third test is positive, one or more ongoing multipoint control video conference may be moved from the network cloud to the fog network 108. In executing this third test, for example, one of a plurality of ongoing multipoint control video conferences requiring no more than the newly available resources in the fog network 108 may be selected for moving from the network cloud to the fog network 108. Alternatively, one of the plurality of ongoing multipoint control video conference having been held for a duration exceeding a predetermined threshold may be selected. In yet another alternative, the ongoing multipoint control video conference having been held for the longest duration among the plurality of such video conferences may be selected. The VPC 114 may use one or more of those criteria, or other criteria, to select one or more ongoing video conferences that should be moved to the fog network 108. Provided that the third test of operation 610 is positive, at least one multipoint control video conference ongoing on the network cloud having been selected, the VPC 114 sends to the SIP 106, at operation 612, an undeployTask(T,Cloud) signal 234, in which "T" designates the selected video conference and "Cloud" indicates that this selected video conference will no longer be held in the network cloud. Also at operation 612, a deployTask(T,N) signal 206 is sent to the SIP 106, in which "T" designates the selected video conference and "N" designates the available multipoint control resource in the fog network 108. A result of this operation 612 is that the selected multipoint control video conference should be moved from the network cloud to the fog network. In a variant, the operation 612 may be executed for a plurality of video conferences if the newly added resources allow.

In an embodiment, the subroutine 600 may be initiated when the VPC 114 has received from the monitoring agent 112 the signal 232 indicating that one single MCU 26 had become available in the fog network 108. In this particular case, the first, second and third tests of operations 606, 608 and 610 are positive, at least one ongoing multipoint control video conference is moved from the network cloud to the fog network 108, and no other operation takes place in the subroutine 600. In another embodiment, the signal 232 may indicate that more than one resource, possibly including at once an MCU 26 and an SFU 12, has become available. In yet another embodiment, the signal 232 may indicate that a resource at once able to handle selective forwarding and multipoint control has become available; this could for example be the case of a fog media server 110 comprising a plurality of cards, including several MCUs 26 and several SFUs 12. In those cases, after operation 612, the subroutine 600 may continue at operation 614. This operation 614, which includes a fourth test, is also executed when the second test of operation 608 or the third test of operation 610 provide negative results. In this fourth test, operation 608 determines whether at least one selective forwarding video conference is ongoing in the network cloud. If the result of the fourth test is positive, a fifth test of operation 616 determines whether a new selective forwarding resource is available in the fog network. If the result of this fifth test is positive, one or more ongoing selective forwarding video conference may be moved from the network cloud to the fog network 108. In executing this fifth test, for example, one of a plurality of ongoing selective forwarding video conference requiring no more than the newly available resources in the fog network 108, or one of the plurality of ongoing selective forwarding video conference having been held for a duration exceeding a predetermined threshold, or the ongoing selective forwarding video conference having been held for the longest duration among the plurality of such video conferences may be selected for moving from the network cloud to the fog network 108. The VPC 114 may use one or more of those criteria, or other criteria, to determine if an ongoing video conference should be moved to the fog network 108. Provided that the fifth test of operation 616 is positive, a selective forwarding video conference ongoing on the network cloud having been selected, the VPC 114 sends to the SIP 106, at operation 618, an undeployTask(T,Cloud) signal 234 and a deployTask(T,N) signal 206, in which "T" designates the selected video conference, "Cloud" indicates that this selected video conference will no longer continue on the network cloud, and "N" designates the available selective forwarding resource in the fog network 108. A result of this operation 618 is that the selected selective forwarding video conference should be moved from the network cloud to the fog network. In a variant, the operation 618 may be executed for more than one video conference if the newly added resources allow.

If the results of the fourth or fifth tests of operations 614 and 616 are negative, no ongoing selective forwarding video conference may be moved from the network cloud to the fog network 108.

Returning to the first test of operation 606, if the result of this test is negative, the indication of a change of availability of resources in the fog network 108 actually indicates a decrease of available resources. It may happen that one resource, for example one SFU 12, one MCU 12, or one server including one or more SFUs 12 and MCUs 26 has become overloaded. It may also happen that one such resource has experienced a failure condition. In other situations, the signal 232 received at the VPC 114 from the monitoring agent 112 may designate a plurality of resources that have become unavailable. Video conferences currently served by the resources of the fog network 108 may be impacted, or not, depending on the particular circumstances. Generally stated, an ongoing video conference being served by a resource that is no longer available may be impacted. Following a negative result of the first test, the VPC 114 determines, in a sixth test of operation of operation 620 if all video conferences currently ongoing on the fog network 108 can still continue without change. This would be the case for example if a previously unused SFU 12 or MCU 26 is experiencing a failure condition while all resources of the fog network 108 currently serving ongoing video conferences remain available. If the result of this sixth test is positive, other than the updating the availability information for that resource (or resources, if more than one has become available) in the database 138 having taken place in operation 604, no further action is taken by the VPC 114.

If the result of the sixth test is negative, the VPC 114 determines, at operation 622, which ones of one or more ongoing video conferences are potentially impacted by the reduction of available resources in the fog network 108. If a particular resource is entirely unavailable (for example as a result of a fault), any ongoing video conference using this resource is selected for moving to the network cloud. If a particular resource is overloaded (its processor reaching its maximum capability), at least one video conference using this resource is selected for moving to the network cloud. For example, one of a plurality of ongoing video conferences using the overloaded resource may be selected because it imposes an important load on that resource. Alternatively, one or more ongoing video conferences having been held on this resource for a duration that is less than a predetermined threshold may be selected. In yet another alternative, the ongoing video conference having been held on that resource for the shortest duration among the plurality of such video conferences may be selected. The VPC 114 may use one or more of those criteria, or other criteria, to select one or more ongoing video conferences that should be moved to the network cloud. Following operation 622, one or more video conferences has been selected for moving from the fog network 108 to the network cloud. At operation 624, for each selected video conference, the VPC 114 sends an undeployTask(T,N) signal 234 to the SIP server 106, in which "T" designates the selected video conference and "N" is the now unavailable resource. In this same operation 624, the VPC 114 sends a refuseTask(T) 222 signal to request the SIP server 106 to redirect the video conference to the network cloud.

While operations 620, 622 and 624 are described without mention of selective forwarding or multipoint control, it should be understood that verifications and selections are made in view of the type of resource that has become overloaded or unavailable. If for example the signal 232 from the monitoring agent indicates that a given MCU 26 has become blocked, any ongoing multipoint control video conference using that given MCU 26 should be moved to the network cloud.

After any one of the operations 612 (in variants where this operation is not followed by operation 614), 614 (in case of a negative result), 616 (in case of a negative result), 618, 620 (in case of a positive result) and 624, the subroutine 600 ends at operation 630 by returning to the sequence 300.

In a particular use case, a given resource of the fog network 108 is initially serving a plurality of video conferences. The signal 232 from the monitoring agent indicates that the given resource is experiencing high processor load. The given resource is still available, but its current loading level now exceeds a predetermined threshold. In an embodiment, the VPC 114 sends one instance of the refuseTask(T) signal 222 to move a selected one of the video conferences from the fog network 108 to the network cloud. If the load on the given resource remains above the predetermined threshold, the monitoring agent 100 should soon send another signal 232 to the VPC 114 that, in response, will execute operations 602, 604, 620, 622 and 624 again to move another video conference to the network cloud.

As in the case of the previously described subroutines, the order the various operations of subroutine 600 is provided for illustration purposes and may be modified without departing from the present disclosure.

It should be expressly understood that implementations for the resource broker, exemplified as the VPC 114, are provided for illustration purposes only. As such, those skilled in the art will easily appreciate other specific implementational details for the VPC 114. Though examples of conference communication events are presented as video conferences, the present resource broker may be tailored to support other conference types, including audio conferences without limitation. As such, by no means, examples provided herein above are meant to limit the scope of the present technology.

In the context of the present disclosure, the VPC 114 executes various tests and forwards signals to the SIP server 106 to indicate that a given ongoing video conference session should be moved from the fog network 108 to the network cloud, or vice versa, indicating one mode between multipoint control and selective forwarding. However, it should be understood that various events such as signaling errors, network faults, congestion, release of the video conference by the participants and similar events may occur within the network 100 of FIG. 2. As such, sending by the VPC 114 of a SIP signal to the SIP server 106 to set up or modify a video conference is expected to succeed in most cases, but not necessarily in all cases. Handling of error conditions that may occur beyond the VPC 114 is not within the scope of the present disclosure.

While the above-described implementations have been described and shown with reference to particular operations performed in a particular order, it will be understood that these operations may be combined, sub-divided, or re-ordered without departing from the teachings of the present technology. Accordingly, the order and grouping of the operations is not a limitation of the present technology.

As such, the methods and systems implemented in accordance with some non-limiting embodiments of the present technology can be represented as follows, presented in numbered clauses.

[Clause 1] A conference control method, comprising:

receiving, at a resource broker, from a conference controller, a first message requesting to set up a conference communication for a first participant, the first message indicating whether a terminal of the first participant supports selective forwarding;

verifying an availability of local resources at the resource broker;

if the first participant's terminal supports selective forwarding and if the local resources are available to serve the conference communication using selective forwarding, sending a reply, from the resource broker to the conference controller, indicating that the conference communication is to be set up on the local resources using selective forwarding;

if the first participant's terminal does not support selective forwarding and if the local resources are available to serve the conference communication using multipoint control, sending a reply, from the resource broker to the conference controller, indicating that the conference communication is to be set up on the local resources using multipoint control;

if the first participant's terminal supports selective forwarding and if the local resources are not available to serve the conference communication using selective forwarding, sending a reply, from the resource broker to the conference controller, indicating that the conference communication is to be set up on a network cloud using selective forwarding; and if the first participant's terminal does not support selective forwarding and if the local resources are not available to serve the conference communication using multipoint control, sending a reply, from the resource broker to the conference controller, indicating that the conference communication is to be set up on the network cloud using multipoint control.

[Clause 2] The method of clause 1, further comprising:

if the conference communication is to be set up on the local resources, adding in the reply, by the resource broker, a reference to a specific local resource for setting up the conference communication.

[Clause 3] The method of any one of clauses 1 or 2, wherein multipoint control and selective forwarding are served by a common local resource.

[Clause 4] The method of any one of clauses 1 or 2, wherein multipoint control and selective forwarding are served by distinct local resources.

[Clause 5] The method of any one of clauses 1 to 4, wherein:

verifying the availability of local resources comprises determining that the local resources are not available if a first rule does not allow the use of the local resources for setting up the conference communication.

[Clause 6] The method of any one of clauses 1 to 5, wherein:

verifying the availability of local resources comprises determining that the local resources are sufficient to serve the conference communication at a predetermined quality of service level.

[Clause 7] The method of any one of clauses 1 to 6, further comprising:

receiving, at the resource broker, from a monitoring agent, a signal indicating one of a loading level and an availability state for a local server; and updating, in a database of the resource broker, one of a current loading level and a current availability state for the local server;

wherein verifying the availability of local resources comprises verifying the current loading level and the current availability state of the local server.

[Clause 8] The method of clause 7, further comprising:

if the signal received from the monitoring agent indicates an increase of available local resources, if the conference communication has been set up on the network cloud using selective forwarding and if local resources are sufficient to serve the conference communication using selective forwarding, sending, from the resource broker to the conference controller, a request to move the conference communication to the local resources using selective forwarding.

[Clause 9] The method of clause 8, wherein:

if a first plurality of conference communications has been set up on the network cloud using selective forwarding, the request to move the conference communication is sent for one of the first plurality of conference communications having been set up on the network cloud for a longer time than all other ones of the first plurality of conference communications.

[Clause 10] The method of any one of clauses 7 or 8, further comprising:

if the signal received from the monitoring agent indicates an increase of available local resources, if the conference communication has been set up on the network cloud using multipoint control and if local resources are sufficient to serve the conference communication using multipoint control, sending, from the resource broker to the conference controller, a request to move the conference communication to the local resources using multipoint control.

[Clause 11] The method of clause 10, wherein:

if a second plurality of conference communications has been set up on the network cloud using multipoint control, the request to move the conference communication is sent for one of the second plurality of conference communications having been set up on the network cloud before the other ones of the second plurality of conference communications.

[Clause 12] The method of any one of clauses 7 to 11, further comprising:

if the signal received from the monitoring agent indicates a decrease of available local resources, if the conference communication has been set up on the local resources using selective forwarding and if local resources are no longer sufficient to serve the conference communication using selective forwarding, sending, from the resource broker to the conference controller, a request to move the conference communication to the network cloud using selective forwarding.

[Clause 13] The method of any one of clauses 7 to 12, further comprising:

if the signal received from the monitoring agent indicates a decrease of available local resources, if the conference communication has been set up on the local resources using multipoint control and if local resources are no longer sufficient to serve the conference communication using multipoint control, sending, from the resource broker to the conference controller, a request to move the conference communication to the network cloud using multipoint control.

[Clause 14] The method of any one of clauses 1 to 13, further comprising:

receiving, at the resource broker, from the conference controller, a second message requesting to add a second participant to the conference communication, the second message indicating whether or not a terminal of the second participant supports selective forwarding; and sending, from the resource broker to the conference controller, a reply indicating that the second participant is to be added to the conference communication.

[Clause 15] The method of clause 14, further comprising:

if the conference communication is ongoing on the network cloud using multipoint control, adding in the reply that the conference communication is to continue on the network cloud using multipoint control.

[Clause 16] The method of any one of clauses 14 or 15, further comprising:

if the conference communication is ongoing on the network cloud using selective forwarding and if the second participant's terminal supports selective forwarding, adding in the reply that the conference communication is to continue on the network cloud using selective forwarding.

[Clause 17] The method of any one of clauses 14 to 16, further comprising:

if the conference communication is ongoing on the network cloud using selective forwarding and if the second participant's terminal does not support selective forwarding, adding in the reply that the conference communication is to continue on the network cloud and that the conference communication is to be changed to use multipoint control.

[Clause 18] The method of any one of clauses 14 to 17, further comprising:

if the conference communication is ongoing on the network cloud using selective forwarding, if the second participant's terminal does not support selective forwarding and if a second rule allows changing the conference communication, adding in the reply that the conference communication is to continue on the network cloud and that the conference communication is to be changed to use multipoint control.

[Clause 19] The method of clause 18, wherein:

the second rule allows changing the conference communication from selective forwarding to multipoint control if a number of participants to the conference communication meets or exceeds a predetermined threshold.

[Clause 20] The method of any one of clauses 18 or 19, further comprising:

if the conference communication is ongoing on the network cloud using selective forwarding, if the second participant's terminal does not support selective forwarding and if the second rule does not allow changing the conference communication, adding in the reply that the conference communication is to continue on the network cloud using selective forwarding.

[Clause 21] The method of any one of clauses 14 to 20, further comprising:

if the conference communication is ongoing on the local resources using multipoint control and if the local resources are available to add the second participant to the conference communication, adding in the reply that the conference communication is to continue on the local resources using multipoint control.

[Clause 22] The method of any one of clauses 14 to 21, further comprising:

if the conference communication is ongoing on the local resources using multipoint control and if the local resources are not available to add the second participant to the conference communication, adding in the reply that the conference communication is to be moved to the network cloud and that the conference communication is to continue using multipoint control.

[Clause 23] The method of any one of clauses 14 to 22, further comprising:

if the conference communication is ongoing on the local resources using selective forwarding, if the second participant's terminal supports selective forwarding and if the local resources are available to add the second participant to the conference communication, adding in the reply that the conference communication is to continue on the local resources using selective forwarding.

[Clause 24] The method of any one of clauses 14 to 23, further comprising:

if the conference communication is ongoing on the local resources using selective forwarding, if the second participant's terminal supports selective forwarding and if the local resources are not available to add the second participant to the conference communication, adding in the reply that the conference communication is to be moved to the network cloud and that the conference communication is to continue using selective forwarding.

[Clause 25] The method of any one of clauses 14 to 24, further comprising:

if the conference communication is ongoing on the local resources using selective forwarding, if the second participant's terminal does not support selective forwarding and if the local resources are available to add the second participant to the conference communication using multipoint control, adding in the reply that the conference communication is to continue on the local resources and that the conference communication is to be changed to use multipoint control.

[Clause 26] The method of any one of clauses 14 to 25, further comprising:

if the conference communication is ongoing on the local resources using selective forwarding, if the second participant's terminal does not support selective forwarding and if the local resources are not available to add the second participant to the conference communication using multipoint control, adding in the reply that the conference communication is to be moved to the network cloud and that the conference communication is to be changed to use multipoint control.

[Clause 27] The method of any one of clauses 14 to 26, further comprising:

if the conference communication is ongoing on the local resources using selective forwarding, if the second participant's terminal does not support selective forwarding, if a third rule allows changing the conference communication and if the local resources are available to add the second participant to the conference communication using multipoint control, adding in the reply that the conference communication is to continue on the local resources and that the conference communication is to be changed to use multipoint control.

[Clause 28] The method of any one of clauses 14 to 27, further comprising:

if the conference communication is ongoing on the local resources using selective forwarding, if the second participant's terminal does not support selective forwarding, if a third rule does not allow changing the conference communication and if the local resources are available to add the second participant to the conference communication using selective forwarding, adding in the reply that the conference communication is to continue on the local resources using selective forwarding.

[Clause 29] The method of any one of clauses 14 to 28, further comprising:

if the conference communication is ongoing on the local resources using selective forwarding, if the second participant's terminal does not support selective forwarding, if a third rule does not allow changing the conference communication and if the local resources are not available to add the second participant to the conference communication using selective forwarding, adding in the reply that the conference communication is to be moved to the network cloud and that the conference communication is to continue using selective forwarding.

[Clause 30] The method of any one of clauses 27 to 29, wherein:

the third rule allows changing the conference communication from selective forwarding to multipoint control if a number of participants to the conference communication meets or exceeds a predetermined threshold.

[Clause 31] The method of any one of clauses 1 to 30, further comprising:

receiving, at the resource broker, from the conference controller, a third message requesting to remove one of the first participant and a second participant from the conference communication;

if the other one of the first participant and the second participant remains in the conference communication, sending, from the resource broker to the conference controller, a reply indicating that the one of the first participant and the second participant is to be removed from the conference communication; and if none of the first participant and the second participant remains in the conference communication, sending, from the resource broker to the conference controller, a reply indicating that the conference communication is to be terminated.

[Clause 32] The method of any one of clauses 1 to 31, wherein the conference communication is a video conference.

[Clause 33] The method of any one of clauses 1 to 32, wherein the resource broker comprises a video processing controller (VPC).

[Clause 34] The method of any one of clauses 1 to 33, wherein the conference controller comprises a session initiation protocol (SIP) server.

[Clause 35] The method of any one of clauses 1 to 34, wherein the first message requesting to set up a conference communication and replies sent by the resource broker to the conference controller comprise session initiation protocol (SIP) signals.

[Clause 36] The method of any one of clauses 1 to 35, wherein the local resources are part of a fog network.

[Clause 37] The method of any one of clauses 1 to 36, wherein the local resources comprise a first selective forwarding unit (SFU).

[Clause 38] The method of any one of clauses 1 to 37, wherein the local resources comprise a first multipoint control unit (MCU).

[Clause 39] The method of any one of clauses 1 to 38, wherein the network cloud comprises a second selective forwarding unit (SFU)

[Clause 40] The method of any one of clauses 1 to 39, wherein the network cloud comprises a second multipoint control unit (MCU).

[Clause 41] A resource broker for assigning resources to conference communications, comprising:
a communication interface adapted to receive messages from and to send replies to a conference controller;
a database adapted to store availability information for local resources; and
a processor operatively connected to the communication interface and to the database, the processor being configured to, in response to a first message received at the communication interface requesting to set up a conference communication for a first participant:
  verify, in the database, an availability of the local resources;
  determine if a terminal of the first participant supports selective forwarding;
  if the first participant's terminal supports selective forwarding and if the local resources are available to serve the conference communication using selective forwarding, prepare a reply indicating that the conference communication is to be set up on the local resources using selective forwarding;
  if the first participant's terminal does not support selective forwarding and if the local resources are available to serve the conference communication using multipoint control, prepare a reply indicating that the conference communication is to be set up on the local resources using multipoint control;
  if the first participant's terminal supports selective forwarding and if the local resources are not available to serve the conference communication using selective forwarding, prepare a reply indicating that the conference communication is to be set up on a network cloud using selective forwarding;
  if the first participant's terminal does not support selective forwarding and if the local resources are not available to serve the conference communication using multipoint control, prepare a reply indicating that the conference communication is to be set up on the network cloud using multipoint control; and
request the communication interface to send the reply to the conference controller.

[Clause 42] The resource broker of clause 41, wherein:
the communication interface is further adapted to receive, from a monitoring agent, a signal indicating one of a loading level and an availability state for a local server; and
the processor is further adapted to update, in the database, one of a current loading level and a current availability state for the local server and to verify the availability of local resources by verifying, in the database, the current loading level and the current availability state of the local server.

[Clause 43] The resource broker of clause 42, wherein the communication interface comprises a first port for communicating with the conference controller and a second port for communicating with the monitoring agent.

[Clause 44] The resource broker of any one of clauses 41 to 43, further comprising:
a memory device operatively connected to the processor and configured to maintain information related to ongoing conference communications.

The resource broker mentioned in clauses 41 to 44 may, without limitation, include the VPC 114 and comprise a processor, such as for example the processor 134, or a plurality of cooperating processors. This processor or the cooperating processors may be programmed to effect the various operations of the clauses 1 to 40. In some embodiments, the processor or the cooperating processors may be programmed to effect all of these operations. In some other embodiments, the processor or the cooperating processors may be programmed to effect a subset of these operations.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these operations and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:
1. A conference control method, comprising:
  receiving, at a resource broker, from a conference controller, a first message requesting to set up a conference communication for a first participant, the first message indicating whether a terminal of the first participant supports selective forwarding;
  verifying an availability of local resources at the resource broker;
  responsive to determining that the first participant's terminal supports selective forwarding and responsive to determining that the local resources are available to serve the conference communication using selective forwarding, sending a reply, from the resource broker to the conference controller, indicating that the conference communication is to be set up on the local resources using selective forwarding;

responsive to determining that the first participant's terminal does not support selective forwarding and responsive to determining that the local resources are available to serve the conference communication using multipoint control, sending a reply, from the resource broker to the conference controller, indicating that the conference communication is to be set up on the local resources using multipoint control;

responsive to determining that the first participant's terminal supports selective forwarding and responsive to determining that the local resources are not available to serve the conference communication using selective forwarding, sending a reply, from the resource broker to the conference controller, indicating that the conference communication is to be set up on a network cloud using selective forwarding; and responsive to determining that the first participant's terminal does not support selective forwarding and responsive to determining that the local resources are not available to serve the conference communication using multipoint control, sending a reply, from the resource broker to the conference controller, indicating that the conference communication is to be set up on the network cloud using multipoint control.

2. The method of claim 1, further comprising:
responsive to determining that the conference communication is to be set up on the local resources, adding in the reply, by the resource broker, a reference to a specific local resource for setting up the conference communication.

3. The method of claim 1, wherein multipoint control and selective forwarding are served by a common local resource.

4. The method of claim 1, wherein multipoint control and selective forwarding are served by distinct local resources.

5. The method of claim 1, wherein:
verifying the availability of local resources comprises determining that the local resources are not available responsive to determining that a first rule does not allow the use of the local resources for setting up the conference communication.

6. The method of claim 1, wherein:
verifying the availability of local resources comprises determining that the local resources are sufficient to serve the conference communication at a predetermined quality of service level.

7. The method of claim 1, further comprising:
receiving, at the resource broker, from a monitoring agent, a signal indicating one of a loading level and an availability state for a local server; and
updating, in a database of the resource broker, one of a current loading level and a current availability state for the local server;
wherein verifying the availability of local resources comprises verifying the current loading level and the current availability state of the local server.

8. The method of claim 1, further comprising:
receiving, at the resource broker, from the conference controller, a second message requesting to add a second participant to the conference communication, the second message indicating whether or not a terminal of the second participant supports selective forwarding; and
sending, from the resource broker to the conference controller, a reply indicating that the second participant is to be added to the conference communication.

9. The method of claim 1, further comprising:
receiving, at the resource broker, from the conference controller, a third message requesting to remove one of the first participant and a second participant from the conference communication;
responsive to determining that the other one of the first participant and the second participant remains in the conference communication, sending, from the resource broker to the conference controller, a reply indicating that the one of the first participant and the second participant is to be removed from the conference communication; and
responsive to determining that none of the first participant and the second participant remains in the conference communication, sending, from the resource broker to the conference controller, a reply indicating that the conference communication is to be terminated.

10. The method of claim 1, wherein the conference communication is a video conference.

11. The method of claim 1, wherein the resource broker comprises a video processing controller (VPC).

12. The method of claim 1, wherein the conference controller comprises a session initiation protocol (SIP) server.

13. The method of claim 1, wherein the first message requesting to set up a conference communication and replies sent by the resource broker to the conference controller comprise session initiation protocol (SIP) signals.

14. The method of claim 1, wherein the local resources are part of a fog network.

15. The method of claim 1, wherein the local resources comprise a first selective forwarding unit (SFU).

16. The method of claim 1, wherein the local resources comprise a first multipoint control unit (MCU).

17. The method of claim 1, wherein the network cloud comprises a second selective forwarding unit (SFU).

18. The method of claim 1, wherein the network cloud comprises a second multipoint control unit (MCU).

19. A resource broker for assigning resources to conference communications, comprising:
a communication interface adapted to receive messages from and to send replies to a conference controller;
a database adapted to store availability information for local resources; and
a processor, the processor being a hardware processor capable of executing software, the processor being operatively connected to the communication interface and to the database, the processor being configured to, in response to a first message received at the communication interface requesting to set up a conference communication for a first participant:
verify, in the database, an availability of the local resources;
determine if a terminal of the first participant supports selective forwarding;
responsive to determining that the first participant's terminal supports selective forwarding and responsive to determining that the local resources are available to serve the conference communication using selective forwarding, prepare a reply indicating that the conference communication is to be set up on the local resources using selective forwarding;
responsive to determining that the first participant's terminal does not support selective forwarding and responsive to determining that the local resources are available to serve the conference communication using multipoint control, prepare a reply indicating that the conference communication is to be set up on the local resources using multipoint control;

responsive to determining that the first participant's terminal supports selective forwarding and responsive to determining that the local resources are not available to serve the conference communication using selective forwarding, prepare a reply indicating that the conference communication is to be set up on a network cloud using selective forwarding;

responsive to determining that the first participant's terminal does not support selective forwarding and responsive to determining that the local resources are not available to serve the conference communication using multipoint control, prepare a reply indicating that the conference communication is to be set up on the network cloud using multipoint control; and request the communication interface to send the reply to the conference controller.

20. The resource broker of claim 19, wherein:

the communication interface is further adapted to receive, from a monitoring agent, a signal indicating one of a loading level and an availability state for a local server; and the processor is further adapted to update, in the database, one of a current loading level and a current availability state for the local server and to verify the availability of local resources by verifying, in the database, the current loading level and the current availability state of the local server.

21. The resource broker of claim 19, wherein the communication interface comprises a first port for communicating with the conference controller and a second port for communicating with the monitoring agent.

* * * * *